US012570246B2

(12) United States Patent
Lackore, Jr.

(10) Patent No.: US 12,570,246 B2
(45) Date of Patent: Mar. 10, 2026

(54) MULTI-STANCE AERIAL DEVICE CONTROL AND DISPLAY

(71) Applicant: Spartan Fire, LLC, Carson City, NV (US)

(72) Inventor: James Roger Lackore, Jr., Big Bend, WI (US)

(73) Assignee: Spartan Fire, LLC, Carson City, NV (US)

( * ) Notice: Subject to any disclaimer, the term of this patent is extended or adjusted under 35 U.S.C. 154(b) by 167 days.

(21) Appl. No.: 18/394,095

(22) Filed: Dec. 22, 2023

(65) Prior Publication Data

US 2024/0123949 A1    Apr. 18, 2024

Related U.S. Application Data

(63) Continuation of application No. 17/197,342, filed on Mar. 10, 2021, now Pat. No. 11,851,035, which is a
(Continued)

(51) Int. Cl.
B60S 9/04 (2006.01)
A62C 27/00 (2006.01)
(Continued)

(52) U.S. Cl.
CPC .................. B60S 9/04 (2013.01); G01C 5/00 (2013.01); G01F 1/00 (2013.01); G01V 11/002 (2013.01);
(Continued)

(58) Field of Classification Search
CPC .... B60S 9/04; G01C 5/00; G01F 1/00; G01V 11/002; A62C 27/00; A62C 31/005;
(Continued)

(56) References Cited

U.S. PATENT DOCUMENTS 4,007,793 A * 2/1977 Hux ........................ A62C 31/24
239/161
4,456,093 A 6/1984 Finley et al.
(Continued)

FOREIGN PATENT DOCUMENTS

EP 0154069 A2 * 9/1985 ........... B66C 23/905
JP 2011057349 A 3/2011
(Continued)

OTHER PUBLICATIONS

Canadian Intellectual Property Office Action for Application No. 3097532 dated Dec. 1, 2021 (4 pages).

*Primary Examiner* — Kyle J Kingsland
(74) *Attorney, Agent, or Firm* — Michael Best & Friedrich LLP

(57) ABSTRACT

A vehicle including an aerial device movable from a first position to a second position. A computer control system includes a sensor that detects an operational parameter of the aerial device when the aerial device is in the first and second positions. The sensor outputs first and second signals for the operational parameter when the aerial device is in the first and second positions. When the aerial device is in the first position, the computer control system generates a first graphical representation of the current operating ability of the aerial device in response to the first signal and displays the first graphical representation on the electronic display. When the aerial device is in the second position, the computer control system generates a second graphical representation of the current operating ability of the aerial device in response to the second signal and displays the second graphical representation on the electronic display.

19 Claims, 21 Drawing Sheets

STABILIZER SPREAD: 16 FT
ELEVATION: 72 DEGREES
EXTENSION: 101 FT
PERSONNEL: 3 AT TIP PLUS 3 USING LADDER

Related U.S. Application Data continuation of application No. 15/885,510, filed on Jan. 31, 2018, now Pat. No. 10,974,702.

(51) Int. Cl.

| | |
|---|---|
| *A62C 31/00* | (2006.01) |
| *A62C 31/28* | (2006.01) |
| *E06C 5/42* | (2006.01) |
| *G01C 5/00* | (2006.01) |
| *G01F 1/00* | (2022.01) |
| *G01V 11/00* | (2006.01) |

(52) U.S. Cl.
CPC ............ *A62C 27/00* (2013.01); *A62C 31/005* (2013.01); *A62C 31/28* (2013.01); *E06C 5/42* (2013.01)

(58) Field of Classification Search
CPC ... A62C 31/28; E06C 5/42; E06C 5/14; E06C 5/36; E06C 7/16; E06C 5/18
See application file for complete search history.

(56) References Cited

U.S. PATENT DOCUMENTS

| | | | |
|---|---|---|---|
| 4,833,615 | A | 5/1989 | Bitner et al. |
| 5,211,245 | A | 5/1993 | Relyea et al. |
| 6,779,961 | B2 | 8/2004 | Barney et al. |
| 7,984,557 | B1 | 7/2011 | Carl |
| 2003/0082041 | A1 | 5/2003 | Barney et al. |
| 2003/0158635 | A1 | 8/2003 | Pillar et al. |
| 2003/0158638 | A1 | 8/2003 | Yakes et al. |
| 2004/0002794 | A1 | 1/2004 | Pillar et al. |
| 2004/0024502 | A1 | 2/2004 | Squires et al. |
| 2007/0034389 | A1 | 2/2007 | Relyea et al. |
| 2007/0173987 | A1 | 7/2007 | Rowe et al. |
| 2012/0091259 | A1 | 4/2012 | Morris et al. |
| 2016/0304051 | A1 | 10/2016 | Archer et al. |
| 2018/0289999 | A1 | 10/2018 | Kay et al. |

FOREIGN PATENT DOCUMENTS

| | | |
|---|---|---|
| KR | 20070092882 A | 9/2007 |
| KR | 1020150073627 A | 7/2015 |

* cited by examiner

STABILIZER SPREAD: 16 FT
ELEVATION: 0 DEGREES
EXTENSION: 101 FT
PERSONNEL: 3 AT TIP

STABILIZER SPREAD: 14 FT
ELEVATION: 0 DEGREES
EXTENSION: 101 FT
PERSONNEL: 2 AT TIP

STABILIZER SPREAD: 12 FT
ELEVATION: 0 DEGREES
EXTENSION: 101 FT
PERSONNEL: 1 AT TIP

STABILIZER SPREAD: 16 FT
ELEVATION: 72 DEGREES
EXTENSION: 101 FT
PERSONNEL: 3 AT TIP PLUS 3 USING LADDER

MULTI-STANCE AERIAL DEVICE CONTROL AND DISPLAY

CROSS-REFERENCE TO RELATED APPLICATIONS

This application is a continuation of U.S. patent application Ser. No. 17/197,342, filed Mar. 10, 2021, which issued as U.S. Pat. No. 11,851,035, on Dec. 26, 2023, which is a continuation of U.S. patent application Ser. No. 15/885,510, filed Jan. 31, 2018, which issued a U.S. Pat. No. 10,974,702 on Apr. 13, 2021, the entire contents all of which are hereby incorporated by reference herein.

FIELD OF THE INVENTION

This invention generally relates to vehicle mounted firefighting aerial devices consisting of ladders or booms, with or without platforms, and more particularly to an aerial device control and display system for use therewith.

BACKGROUND OF THE INVENTION

Traditional firefighting aerial devices used by fire departments in the United States leave control of the aerial device in the hands of the operator who is responsible for referencing a physical load chart that describes the operational parameters of the device in text and graphics.

Factors that affect the operational parameters of the aerial device include the number of people on the ladder and/or in the platform, the placement of the people on the ladder and/or in the platform, the extension of the aerial device, the elevation of the aerial device, the rotation of the aerial device, and whether the aerial device is charged with or flowing water.

In addition, typically fire trucks that deploy an aerial device require the use of stabilizers that extend from the frame of the fire truck when the aerial device is in use in order to provide support to the fire truck in order to prevent the fire truck from tipping in the direction that the aerial device is deployed due to the weight of the aerial device being extended beyond the center of gravity of the fire truck.

A first traditional control panel 50 for an aerial device is illustrated in FIG. 19 and a second traditional control panel for an aerial device is illustrated in FIG. 20. As illustrated in FIG. 19, the traditional control panel 50 for an aerial device includes a controller 52 and a traditional physical load chart 54. The controller 52 has a joystick 56 that can be moved in a forward direction 58, a reverse direction 60, a first side direction 62, and a second side direction 64 that is opposite the first side direction 62.

To extend the ladder and platform a first direction, the operator will push the joystick 56 in the forward direction 58. Likewise, to retract the ladder and platform, the operator will push the joystick 56 in the reverse direction 60.

Further, to rotate the ladder and platform, an operator will push the joystick 56 in the first side direction 62 to rotate the ladder in the first direction and will push the joystick 56 in the second side direction 64 to rotate the ladder in the second direction.

As illustrated in FIG. 20, the traditional control panel 50 for an aerial device includes a controller 51 and a traditional physical load chart 54. The controller 51 has a first, second, and third lever 57. The first lever can be moved in a first direction 59 and a second direction 61. The second lever can be moved in first direction 63 and a second direction 65. And the third lever can be moved in a first direction 67 and a second direction 69.

To extend the aerial device in a first direction, the operator will push the first lever in the first direction 59. Likewise, to retract the aerial device, the operator will push the lever in the second direction 61 reverse that of the first direction 59.

Further, to rotate the ladder and platform, an operator will push the second lever in the first direction 63 to rotate the ladder in the first direction and will push the lever in the second direction 65 to rotate the ladder in the second direction.

Also, raise the aerial device away from the ground, an operator will push the third lever in the first direction 67 and to lower the aerial device closer to the ground a user will push the third lever in the second direction 69.

However, before rotating, extending, retracting, raising or lowering the ladder and platform using the traditional control panels 50 illustrated in FIGS. 19 and 20, the operator must first consult the traditional physical load chart 54. The traditional physical load chart 54 provides instructions and illustrations of the operational parameters the aerial device.

Further, the aerial device may be equipped with piping and a nozzle (monitor) mounted on the device which can be charged with water from the fire truck pump or other source to discharge water and an elevated height onto the fire. The reaction force from the flow of the water, and the downward force from the weight of the water, must be accounted for on the load chart and considered by the operator.

For example, typically a traditional physical load chart 54 includes the following operational parameters for the aerial device being used that the operator must take into consideration before moving the aerial device: the number of people on the platform, the placement of the people on the aerial device, the angle 68 at which the aerial device is being extended, the height 70 of the aerial device, the reach 72 of the extended aerial device, the rotation 66 of the aerial device, and whether the aerial device is charged with or flowing water out of the aerial device.

The typical physical load charts used by fired departments in the United States will often times only describe the operational parameters of the aerial device when the stabilizers of the firetruck are fully deployed.

However, this can be problematic, as in practice full deployment of the stabilizers is not always possible, especially in urban areas where parked cars and other obstacles often times will obstruct the full deployment of the stabilizers.

Further, due to the uncertainty of where the next fire will start or where the next call will take them, the fire departments have no way to plan ahead or, often times, even the time to fully assess their location to make a determination of where to optimally place the firetruck to allow for the full deployment of the stabilizers before using the aerial device.

Next, the traditional aerial devices and platforms used outside of the United States, such as in Europe, will typically use a more complex system to measure the active load on the aerial ladder that takes into consideration the deployment position of the stabilizers.

Typically, the systems outside of the United States will utilize a computer control system coupled to load sensors that will detect when the device is reaching its maximum load depending on position of the stabilizers and will stop any further deployment of the aerial device before the aerial device exceeds its maximum load and becomes unstable.

However, the problem with the systems typically used outside the United States is that system relies on using sensitive load sensors that inevitably are damaged due to the generally rough nature of fighting fires.

As will be understood, when the load sensors in the system is damaged it becomes extremely problematic as most fire departments only have a limited number of firetrucks and often times even fewer firetrucks that are fitted with an aerial device.

Therefore, any downtime caused by the damaged load sensor can put the lives of the firefighters and the people they are trying to help in danger by not providing the firefighters with a firetruck or additional firetrucks with an aerial device, which may be needed to safely put out a fire or to safely rescue a person trapped in a building that is on fire.

Further, due to the load sensors being easily damaged current fire departments employing systems using load sensors are required to conduct high levels of maintenance and service on the sensors even when they are not currently damaged to avoid the situation where they need to deploy the aerial device while at a call and then find out that they cannot deploy the aerial device due to a load sensor that has been damaged since the last time the aerial device was deployed.

In view of the above, there is a need for a system that overcomes one or more of those problems. Embodiments of the present invention provide such a system for controlling the deployment of an aerial device. These and other advantages of the invention, as well as additional inventive features, will be apparent from the description of the invention provided herein.

BRIEF SUMMARY OF THE INVENTION

Embodiments of the present invention provide a system that replaces the traditional printed load chart used in the United States with operational instructions conveyed via an electronic display.

The system has a computer control system that senses the extension of the stabilizers and the extension, elevation, and rotation of the aerial device. Then the system provides an appropriate graphical representation of the capability of the device to the operator of the aerial device on an electronic display.

The system's graphics will change as the device is repositioned, so that the operator sees only that information needed for that configuration, which allows the user to safely maneuver the aerial device.

Further, the graphical information of the system will adjust depending on the deployment position of the stabilizers of the fire truck to which the aerial device is coupled.

This means that if there is sufficient room to completely deploy the stabilizers, the graphical display of the system will show the full capability of the device. However, if the stabilizers can only be deployed partially, the tip load (number of personnel allowed at various regions on the ladder) will be reduced accordingly.

As will be understood, embodiments of the present invention allow the operator to use the aerial device to the greatest extent possible without the reduced reliability that comes with a device that attempts to measure dynamic load.

Further, embodiments of the present invention can be utilized with fire departments that are capable of fully deploying the stabilizers, such as suburban fire departments, and can benefit from the higher tip loads that go with the wider deployment of the stabilizers. Embodiments can also be used with fire departments that are willing to deal with a smaller tip load in order to allow for a more narrow deployment of the stabilizers, such as urban fire departments that will often times have to deal with obstructions, such as cars or narrow streets, that prevent the full deployment of the stabilizers during use of the aerial device.

In one aspect, an embodiment of the present invention provides a controller for a multi-stance aerial device having a control panel with an electronic display to provide a graphical representation of a current operating ability of an aerial device. The electronic display is electrically coupled to a computer control system having a sensor that detects a piece of data about an operational parameter of the aerial device and the computer control system sends a second graphical representation to the electronic display if the operational parameter of the aerial device has changed.

In one aspect according to an embodiment of the present invention, the sensor is a stabilizer sensor.

In one embodiment, the operational parameter detected by the stabilizer sensor is the spread of a stabilizer.

In yet another aspect, the sensor is an aerial elevation sensor.

In one embodiment, the operational parameter detected by the aerial elevation sensor is the maximum elevation of the platform of the aerial device.

In yet another aspect, the sensor is an aerial rotation sensor.

In one embodiment, the operational parameter detected by the aerial rotation sensor is a position about the rotational axis of the aerial device.

In yet another aspect, the sensor is an aerial extension sensor.

In one embodiment, the aerial extension sensor senses the position of the aerial device along an extension axis.

According to another embodiment, the present invention, a system for controlling a multi-stance aerial device is provided having a controller and a control panel having an electronic display for providing a graphical representation of a current operating ability of an aerial device. The electronic display is electrically coupled to a computer control system having a sensor that detects a piece of data about an operational parameter of the aerial device. The computer control system sends a graphical representation to the electronic display of the operational parameters of the aerial device.

In yet another embodiment, the sensor is a stabilizer sensor for detecting the spread of a stabilizer on a vehicle coupled to the aerial device.

In yet another embodiment, the system for controlling a multi-stance aerial device has a second sensor for detecting a second piece of data about a second operational parameter of the aerial device.

In one embodiment, the second sensor is an aerial rotation sensor.

In yet another embodiment, the system for controlling a multi-stance aerial device also has a third sensor for detecting a third piece of data about a third operational parameter of the aerial device.

In one embodiment, the third sensor is an aerial elevation sensor.

In yet another aspect, the sensor is a fluid presence sensor.

In one embodiment, the fluid presence sensor senses whether there is fluid in the piping.

In yet another aspect, the sensor is a fluid flow sensor.

In one embodiment, the fluid flow sensor senses whether there is fluid flowing out of the fluid monitoring nozzle.

According to another embodiment of the present invention, a method for controlling a multi-stance aerial device including calculating an operating ability of an aerial device with a computer control system based on a piece of data received from an aerial rotation sensor, an aerial elevation sensor, an aerial extension sensor, or a stabilizing sensor with a computer control system. Also included in the method is displaying a graphical representation of the current operating ability of an aerial device on an electronic display.

In yet another aspect, the operating ability of the aerial device is calculated using rotational position data of the aerial device about an axis sensed by the aerial rotation sensor.

In yet another aspect, the operating ability of the aerial device is calculated using elevation data of the aerial device sensed by the aerial elevation sensor.

In still yet another aspect, the operating ability of the aerial device is calculated using extension data of the aerial device along an axis sensed by the aerial extension sensor.

In yet another embodiment, the method for controlling a multi-stance aerial device includes calculating a second operating ability of the aerial device based on a second piece of data received from the aerial rotation sensor, the aerial elevation sensor, the aerial extension sensor, or the stabilizing sensor with the computer control system. Also included in the method, is displaying a second graphical representation on the electronic display based on the second operating ability of the aerial device calculated by the computer control system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1A:
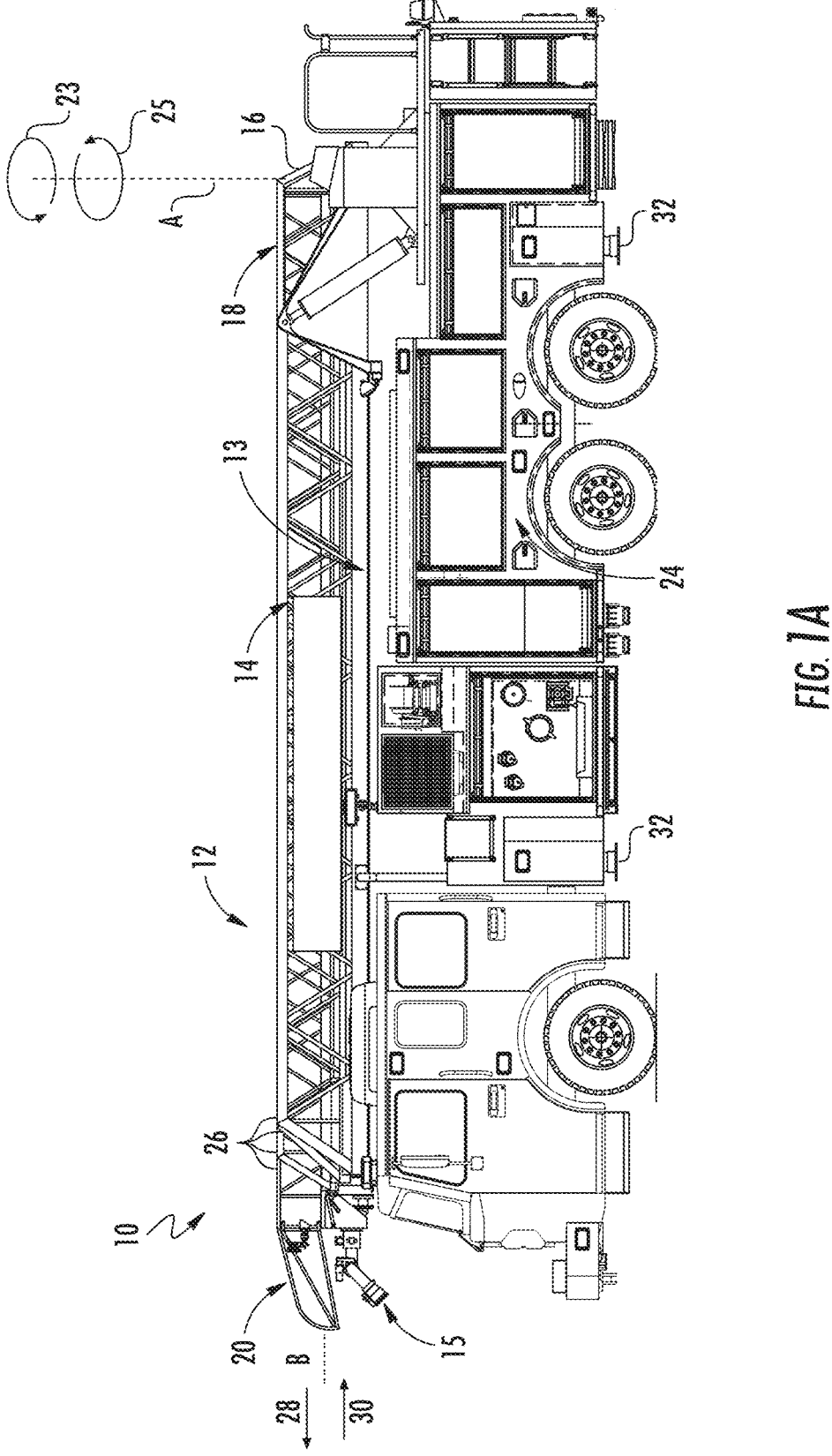
FIG. 1A is a side view of a vehicle with an aerial device incorporating an embodiment of the present invention.
Figure 1B:
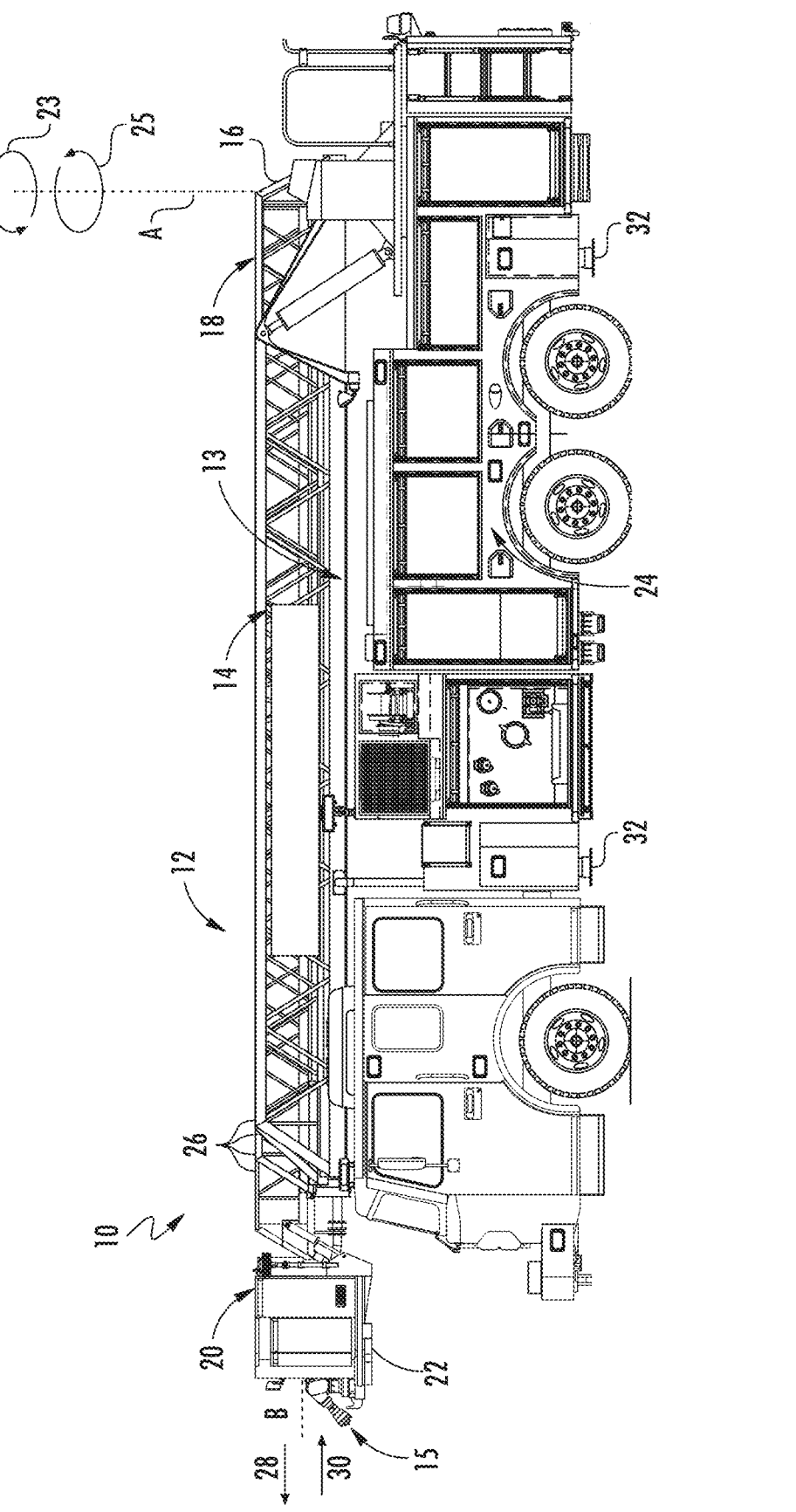
FIG. 1B is a side view of a vehicle with an aerial device incorporating an further embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIGS. 1-6 illustrate a vehicle 10 with an aerial and platform device 12. The aerial device 12 includes a ladder 14 and a control means 16. In FIG. 1A the ladder 14 of the aerial device 12 has a first end 18 that is coupled to the control means 16 and a second end 20 that is free. In FIG. 1B the ladder of an the aerial device 12 has a first end 18 that is coupled to the control means 16 and a second end 20 that is coupled to a platform 22.

Extending along the ladder 14 of the aerial device 12 may be piping 13 designed to allow fluid, such as water, to flow from the piping 13 when the fluid is sufficiently pressurized. At the end of the piping 13 can be a fluid monitor nozzle 15 that can meter the flow of the pressurized fluid being expelled from the piping 13.

Figure 4:
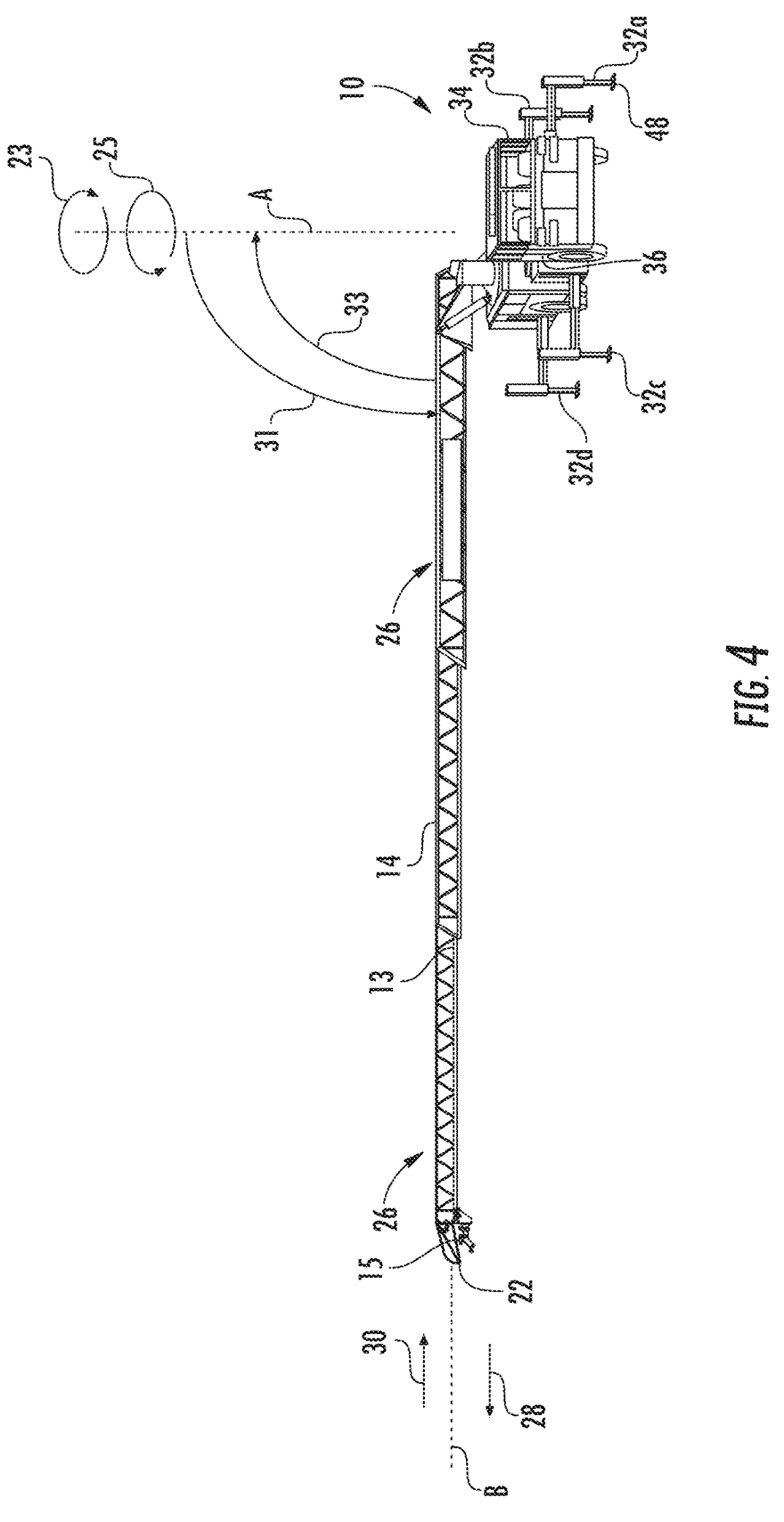
FIG. 4 is a front perspective view of the vehicle of FIG. 1A illustrating the ladder in an extended position generally parallel to the ground.

The control means 16 of the vehicle 10 can rotate the ladder 14 and/or ladder 14 and platform 22 about vertical axis A in a first direction 23 and a second direction 25 that is opposite the first direction 23 while the body 24 of the vehicle 10 remains stationary. Further, the control means 16 can extend and retract the aerial device 12 along a first direction 28 of axis B and a second direction 30 of axis B that is opposite the first direction 28 of axis B. Finally, as shown in FIG. 4, the control means 16 can also control the pitch or angle of the aerial device 12 by lowering the aerial device 12 radially in a first direction 31 and raising the aerial device 12 radially in a second direction 33 that is opposite the first direction 31.

As will be understood, the rotation of the control means 16 about vertical axis A will also cause rotation of the ladder 14 about vertical axis A of the control means 16 due to the first end 18 of the ladder 14 being coupled with the control means 16 of the vehicle 10.

As will also be understood, the ladder 14 includes a number of segments 26 that are slidably supported over one another such that the ladder 14 can be extended by sliding the segments 26 in a first direction 28 along axis B relative to one another and retracted by sliding the segments 26 in a second direction 30 along axis B that is opposite the first direction 28 relative to one another.

As will be understood, as the segments 26 of the ladder 14 are slidable over one another to extend the ladder 14 it will also cause the platform 22 coupled to the ladder 14 to be extended. Likewise, as the segments 26 of the ladder 14 are slide over one another to retract the ladder it will also cause the platform 22 coupled to the ladder 14 to be retracted.

As the aerial device 12 is moved by the control means 16 the weight of the ladder 14 and the platform 22 shifts from one position to the next. For example, as the aerial device 12 moves from the position illustrated in FIG. 3 to the position illustrated in FIG. 4 the weight of the aerial device 12 is no longer centered over the body 24 of the vehicle 10. As the weight of the aerial device 12 shifts away from the center of the body 24 of the vehicle 10 it will cause the vehicle 10 to also shift in the same direction that the aerial device 12 is shifting. This can both destabilize the vehicle 10 along with the aerial device 12 that is being supported by the vehicle 10.

Figure 2:
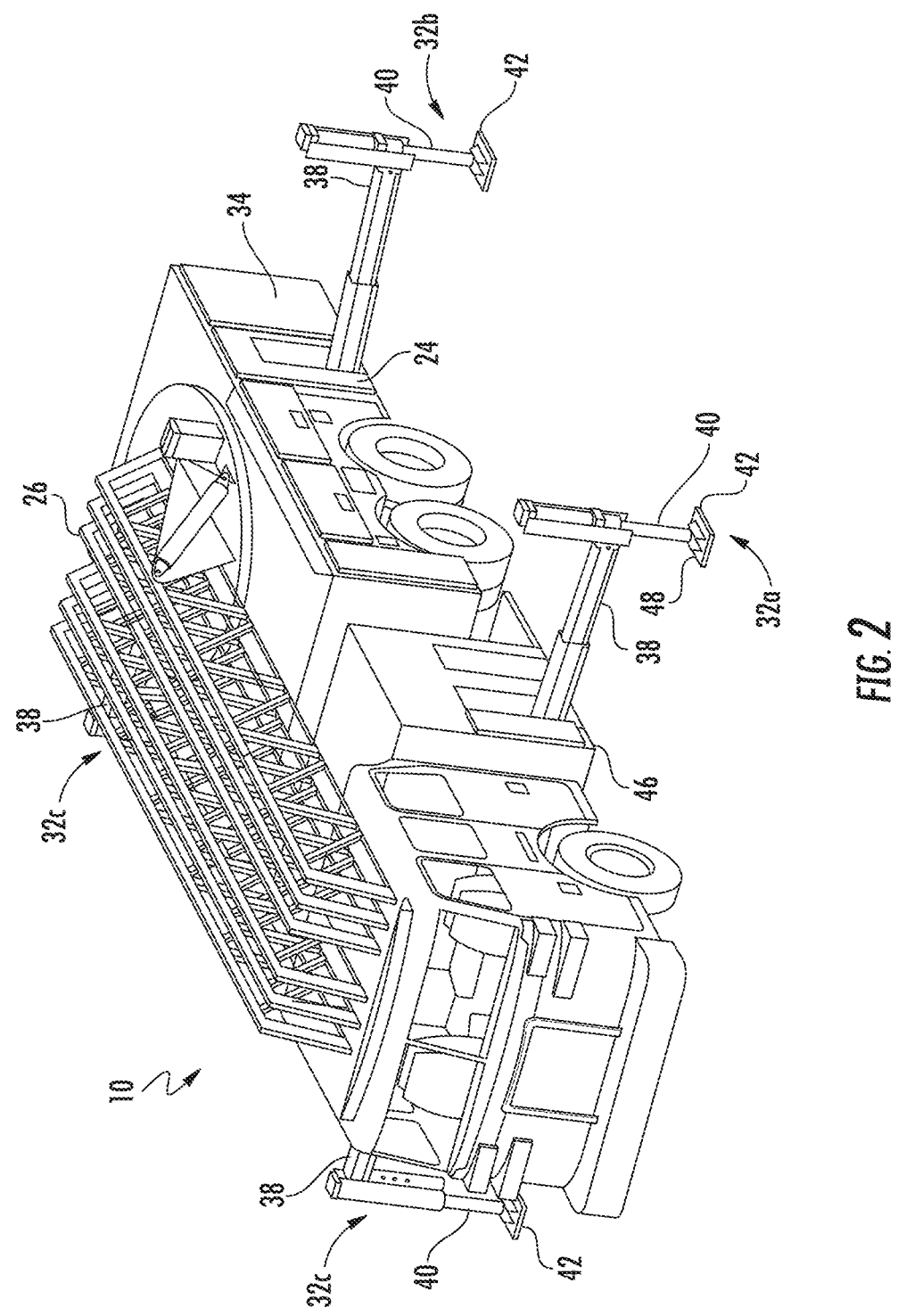
FIG. 2 is a perspective view of the vehicle of FIG. 1A further illustrating the stabilizers in an extended position.
Figure 3:
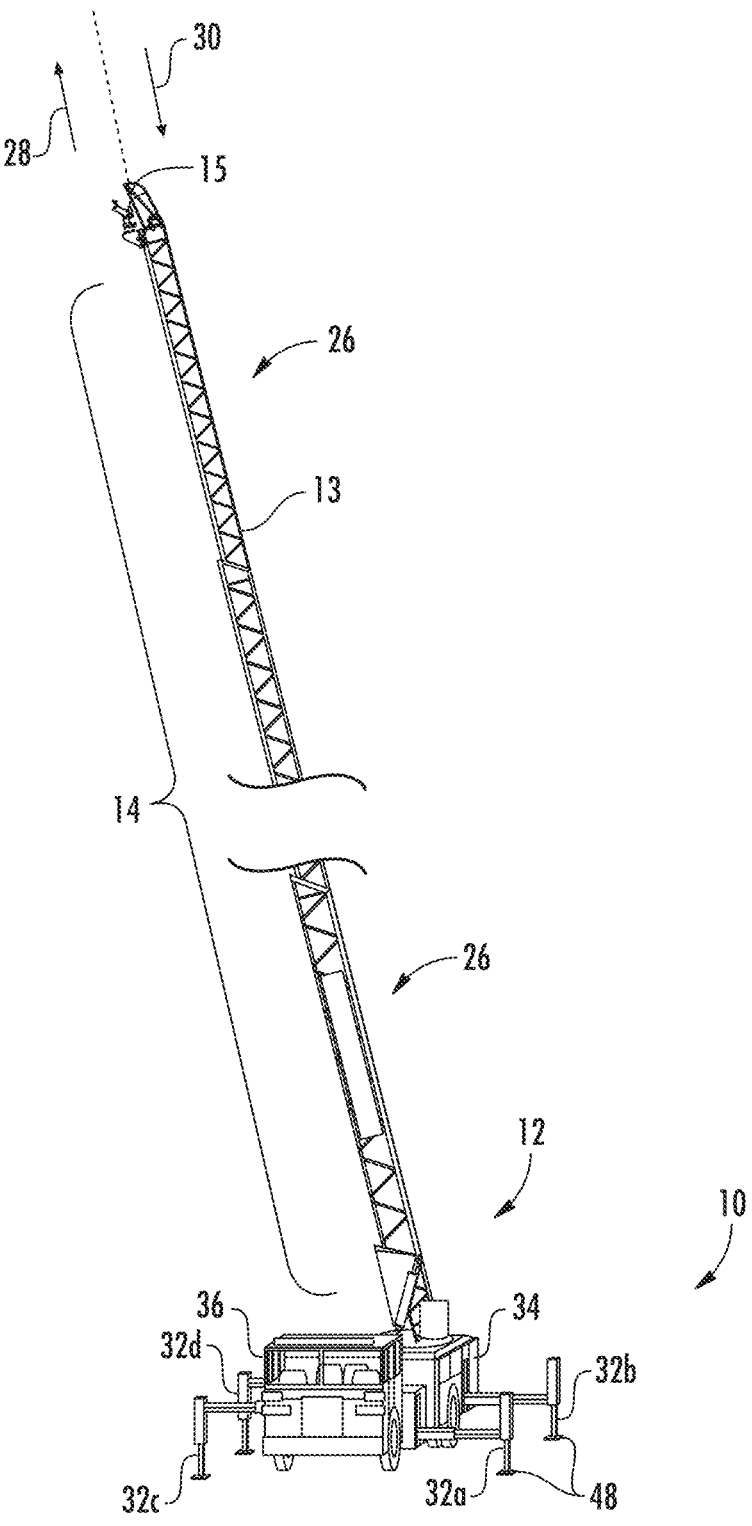
FIG. 3 is a front perspective view of the vehicle of FIG. 1A illustrating an exploded view of the ladder and being extended generally perpendicular to the ground.

As shown in FIG. 2, to prevent the destabilization of the vehicle 10 and the aerial device 12, the vehicle 10 includes stabilizers 32*a*, 32*b*, 32*c*, and 32*d* that provide support to the vehicle 10 and the ladder 14 by widening the base of support of the vehicle 10. As will be understood, the base of support of the vehicle 10 is widened by increasing the amount of area underneath the outermost contact points of the vehicle by extending the stabilizers 32*a*, 32*b*, 32*c*, and 32*d* away from the vehicle 10 and allowing the stabilizers 32*a*, 32*b*, 32*c*, and 32*d* to make contact with the ground 48 surrounding the vehicle 10.

As illustrated, the stabilizers 32*a*, 32*b* extend from the first side 34 of the body 24 of the vehicle 10 and stabilizers 32*c*, 32*d* that extend from the second side 36 of the body of the vehicle 10. The stabilizers 32*a*, 32*b*, 32*c*, 32*d* include a bar 38, a shaft 40 and a stabilizing pad 42 that makes contact with the ground 48 surrounding the vehicle 10.

Figure 5:
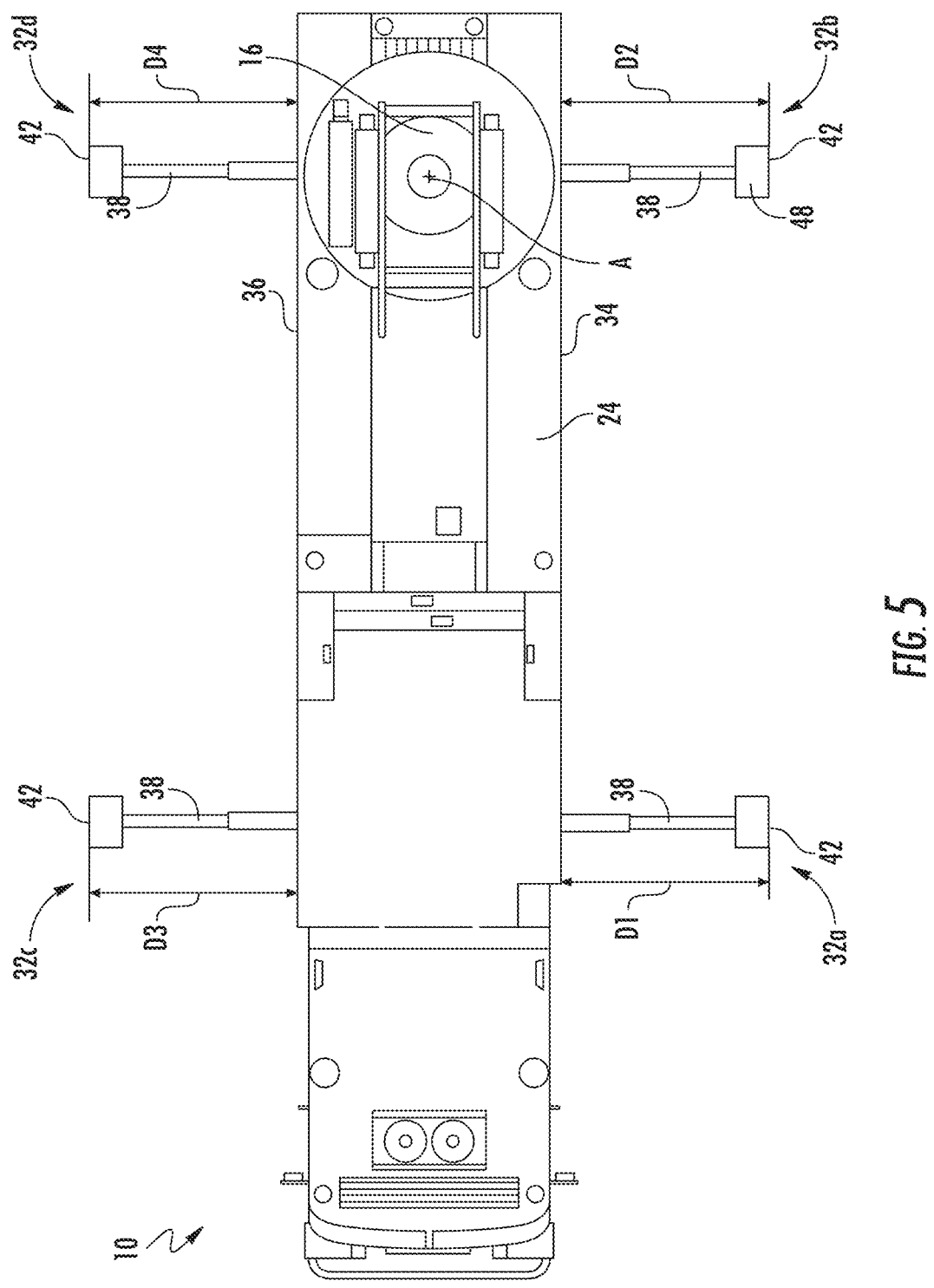
FIG. 5 is a top down view of the vehicle illustrate in FIG. 1A illustrating the stabilizers in a fully extended position.

FIG. 5 illustrates the stabilizers 32*a*, 32*b*, 32*c*, 32*d* in a fully extended position where the bars 38 of the stabilizers 32*a*, 32*b* have been extended their full length relative to the first side 34 of the vehicle 10 and the bars 38 of stabilizers 32*c*, 32*d* have been extended their full length relative to the second side 36 of the vehicle 10.

When the beams 38 of the stabilizers 32*a*, 32*b*, 32*c*, 32*d* have been fully extended then the jacks 40 are extended generally perpendicular to the beams 38 and then the stabilizing pads 42, which are generally perpendicular to the jacks 40 make contact with and rest against the ground 48.

As will be understood, when the stabilizing pads 42 of the stabilizers 32*a*, 32*b*, 32*c*, 32*d* make contact with the ground 48 they act as a way to provide support to and stabilize the vehicle 10 from the shifting load created by the rotation of the ladder and aerial platform device 12 about axis A as well as the extension and retraction of the aerial device 12 along axis B.

Figure 6:
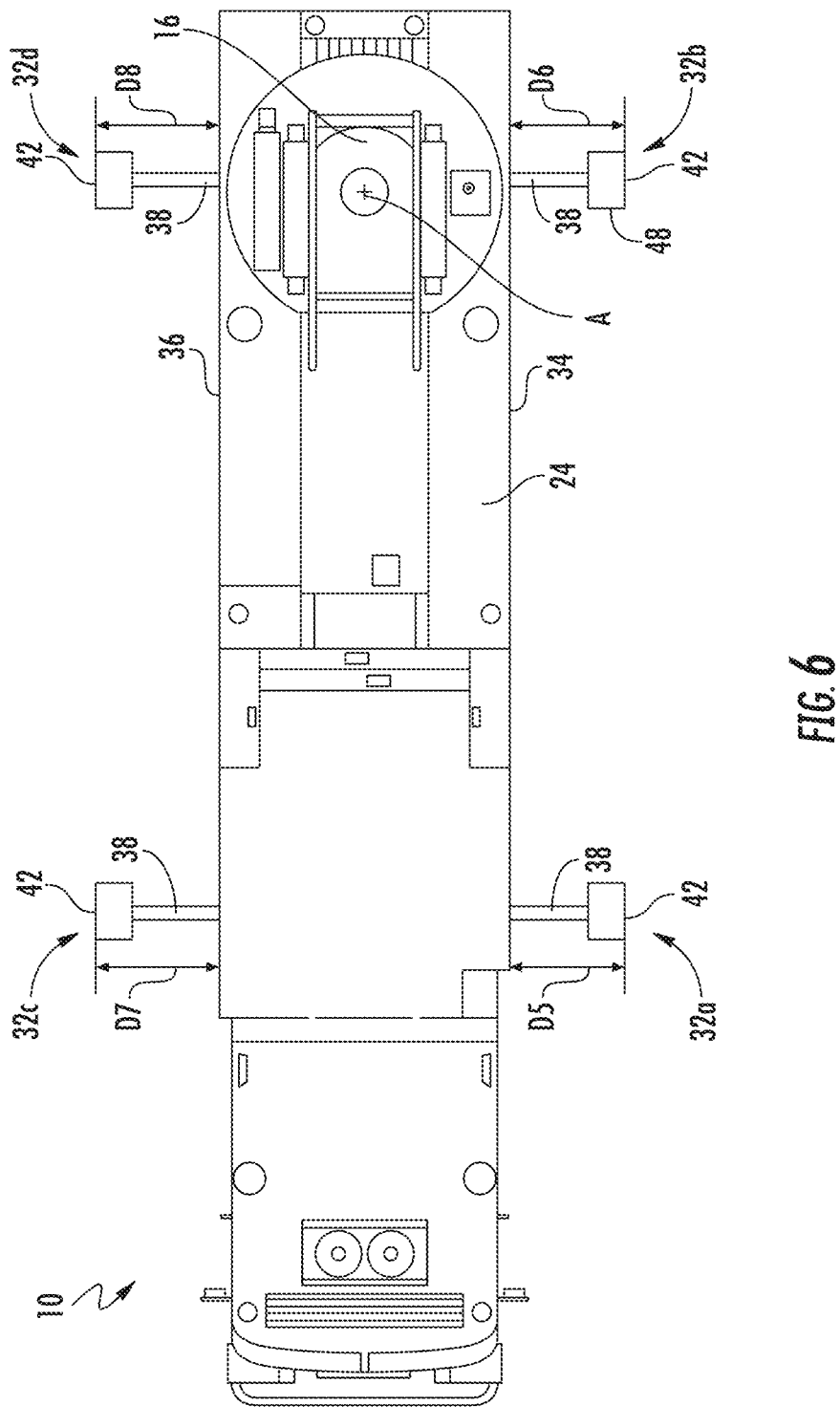
FIG. 6 is a top down view of the vehicle illustrate in FIG. 1A illustrating the stabilizers in a partially extended position.
Figure 7:
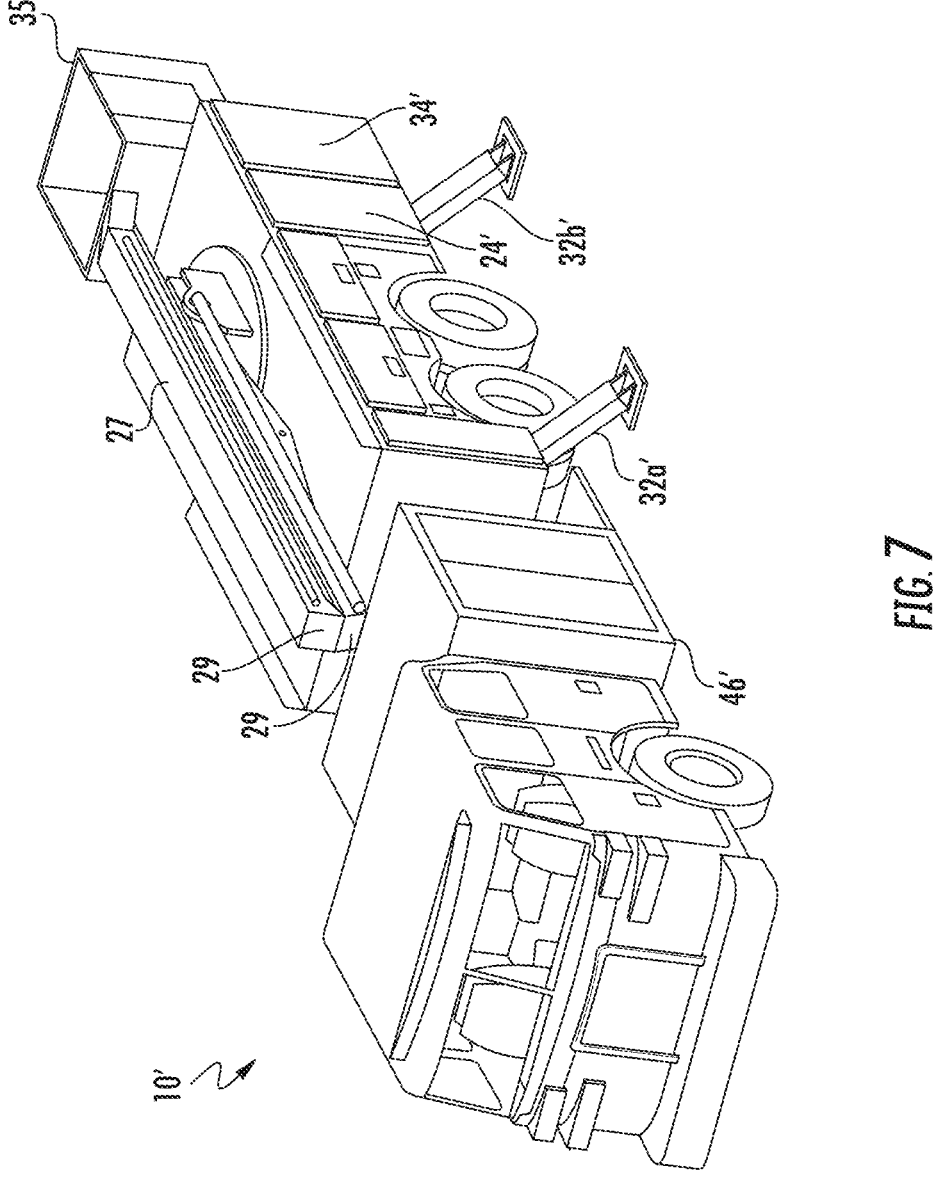
FIG. 7 is a perspective view of another embodiment of a vehicle including an device and stabilizers in an extended position.

FIG. 6 illustrates the stabilizers 32*a*, 32*b*, 32*c*, 32*d* in only a partially extended position. The stabilizers 32*a*, 32*b*, 32*c*, 32*d* are only extended a distance D5, D6, D7, D8 that represents a portion the fully extended positions D1, D2, D3, D4 of respective stabilizers 32*a*, 32*b*, 32*c*, 32*d* (see FIG. 5).

As will be understood, when the stabilizers 32*a*, 32*b*, 32*c*, 32*d* are in their fully extended position, as shown in FIG. 5, they provide the maximum amount of support to the vehicle 10 when the aerial device 12 is deployed because the full extension of the stabilizers 32*a*, 32*b*, 32*c*, 32*d* creates the largest base of support for the vehicle 10, which in turn helps to prevent the vehicle 10 from tilting as the weight of the aerial device 12 is shifted during its use.

As will also be understood, when the stabilizers 32*a*, 32*b*, 32*c*, 32*d* are in their partially extended position, as shown in FIG. 6, they provide only a portion of the maximum amount of support to the vehicle 10 when the aerial device 12 is deployed relative to when stabilizers 32*a*, 32*b*, 32*c*, 32*d* are in their fully extended position (see FIG. 5) because the stabilizers 32*a*, 32*b*, 32*c*, 32*d* are forming only a portion of the largest support base possible for the vehicle 10, which, as discussed above, is when the stabilizers 32*a*, 32*b*, 32*c*, 32*d* are in their fully extended positon (see FIG. 5).

Thus, when the stabilizers 32*a*, 32*b*, 32*c*, 32*d* are in their partially extended position they do provide support to the vehicle 10 to help it from tilting as the weight of the aerial device 12 is shifted during its use, but not as much support as when the stabilizers 32*a*, 32*b*, 32*c*, 32*d* are in their fully extended position (see FIG. 5).

FIGS. 7-11 illustrate another embodiment of a vehicle 10' having an aerial device 12'. The aerial device 12' includes a boom 27 comprising foldable segments 29 that are capable of being folded over one another to extend and retract the aerial device 12'. The aerial device 12' also includes a control means 16 coupled to a first end of the boom 27 and a bucket 35 coupled to a second end of the boom 27.

The boom 27 of the aerial device 12 also includes piping 13' designed to expel a fluid, such as water, from the piping 13' when the fluid has been sufficiently pressurized. At the end of the piping 13' is a fluid monitor nozzle 15' designed to meter expulsion of the pressurized fluid from the piping 13' extending along the boom 27 of the aerial device 12'.

The control means 16' of the vehicle 10' can rotate the aerial device 12' about vertical axis A' in a first direction 23' and a second direction 25' that is opposite the first direction 23' while the body 24' of the vehicle 10' remains stationary. Further, the control means 16' can extend and retract the aerial device 12' along a first direction 28' of axis B' and a second direction 30' of axis B' that is opposite the first direction 28' of axis B'.

Figure 9:
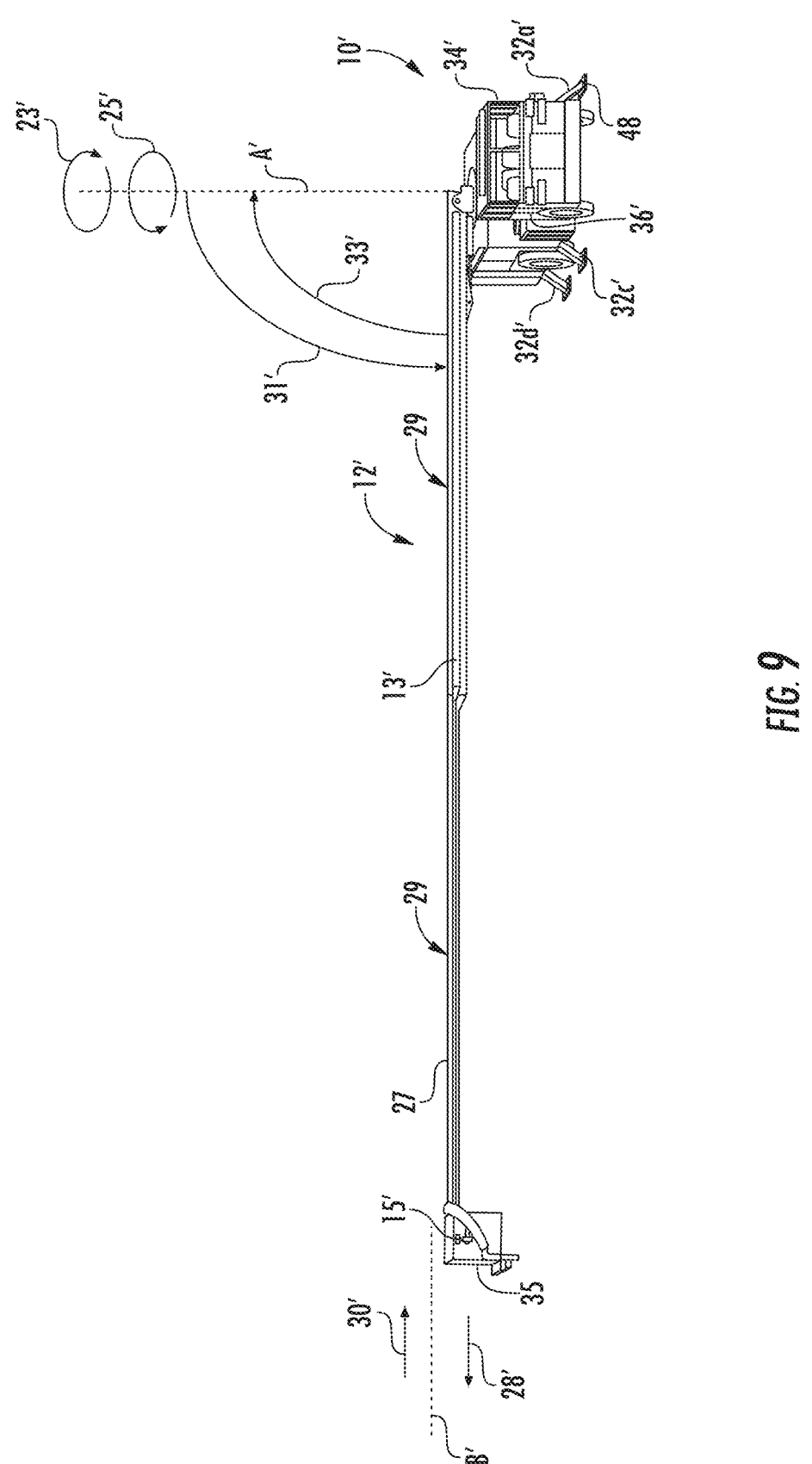
FIG. 9 is a front perspective view of the vehicle of FIG. 7 illustrating the boom and bucket extended in a second position relative to the ground.

Further, as shown in FIG. 9, the control means 16' can also control the pitch or angle of the aerial device 12' by lowering the aerial device 12' radially in a first direction 31' and raising the aerial device 12' radially in a second direction 33' that is opposite the first direction 31'.

As will be understood, the rotation of the control means 16' about vertical axis A' will also cause rotation of the aerial device 12' about vertical axis A' of the control means 16' due to the first end of the boom 27 being coupled with the control means 16' of the vehicle 10'.

Figure 8:
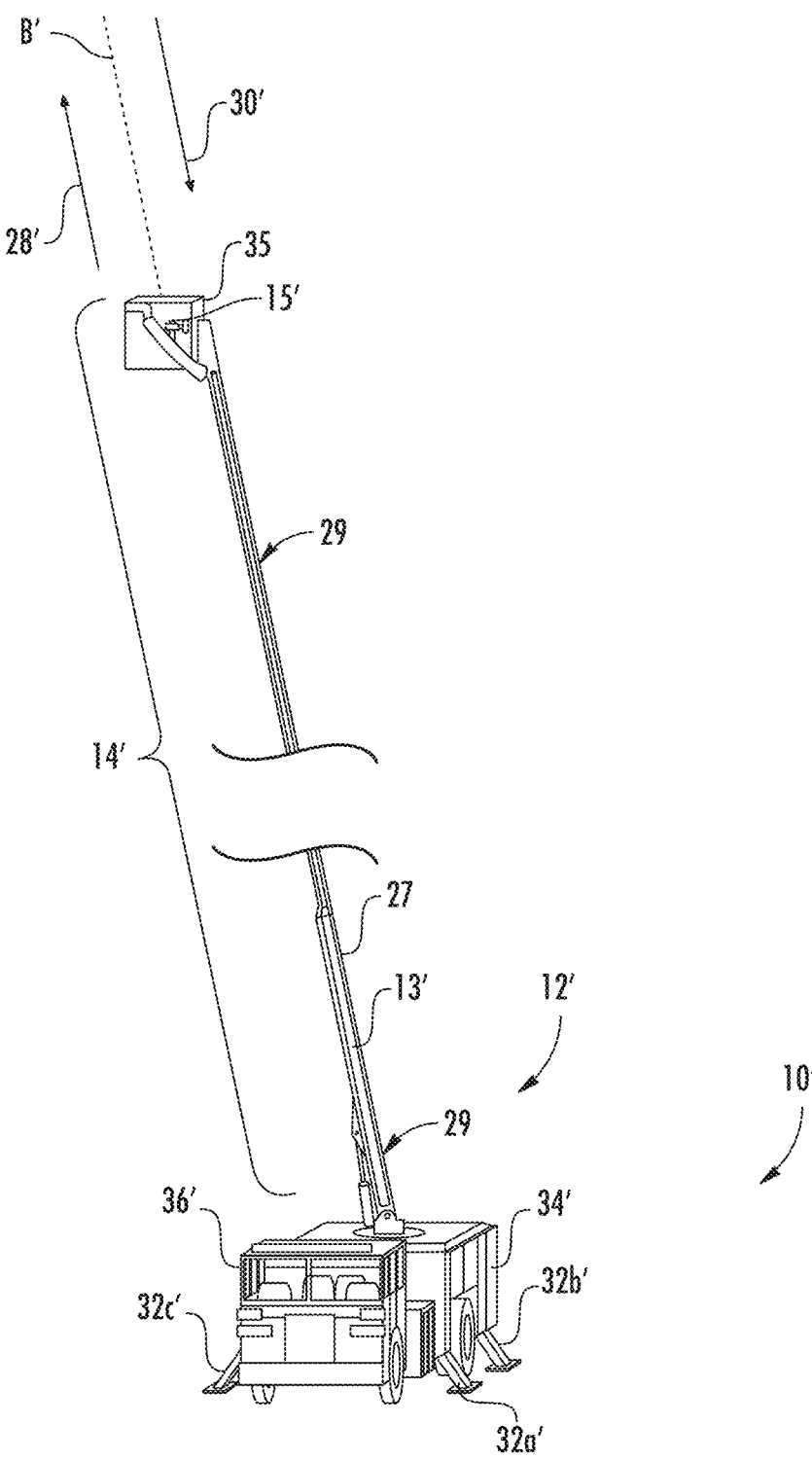
FIG. 8 is a front perspective view of the vehicle of FIG. 7 illustrating the boom and bucket of the aerial device extended in a first position relative to the ground.

As will also be understood, when a user wants to extend the aerial device 12' along axis B' the user will instruct the control means 16' to unfold the foldable segments 29 which will cause the boom 27 of the aerial device 12' to extended in a first direction 28' along axis B' (see FIGS. 8 and 9). If a user wants to retract the aerial device 12' the user will instruct the control means 16' to fold the foldable segments 29 which will cause the boom 27 of the aerial device 12' retract in a second direction 30' along axis B' (see FIG. 7).

Further, as the foldable segments 29 of the aerial device 12' are unfolded to extend the boom 27 in the first direction 28' along axis B' it will also cause the bucket 35 coupled to the end of the boom 27 to also extend in the first direction 28' along axis B'. Further, as the foldable segments 29 of the aerial device 12' are folded to retract the boom 27 along the second direction 30' along axis B' it will cause the bucket 35 coupled to the end of the boom 27 to retract along the second direction 30' along axis B'. Thus, as will be understood, a user can control the position of the bucket 35 by sending instructions to control means 16' to either fold or unfold the foldable segments 29 to extend or retract the boom 27 of the aerial device 12'.

Next, as the aerial device 12' is moved by the control means 16' the weight of the boom 27 and bucket 35 shifts from one position to the next. For example, as the aerial device 12' moves from the position illustrated in FIG. 8 to the position illustrated in FIG. 9 the weight of the aerial device 12' shifts such that it is no longer centered over the body 24' of the vehicle 10'. As the weight of the aerial device 12' shifts away from the center of the body 24' of the vehicle 10' it will cause the vehicle 10' to also shift in the same direction that the aerial device 12' is shifting. This can both destabilize the vehicle 10' along with the aerial device 12' that is being supported by the vehicle 10'.

Figure 10:
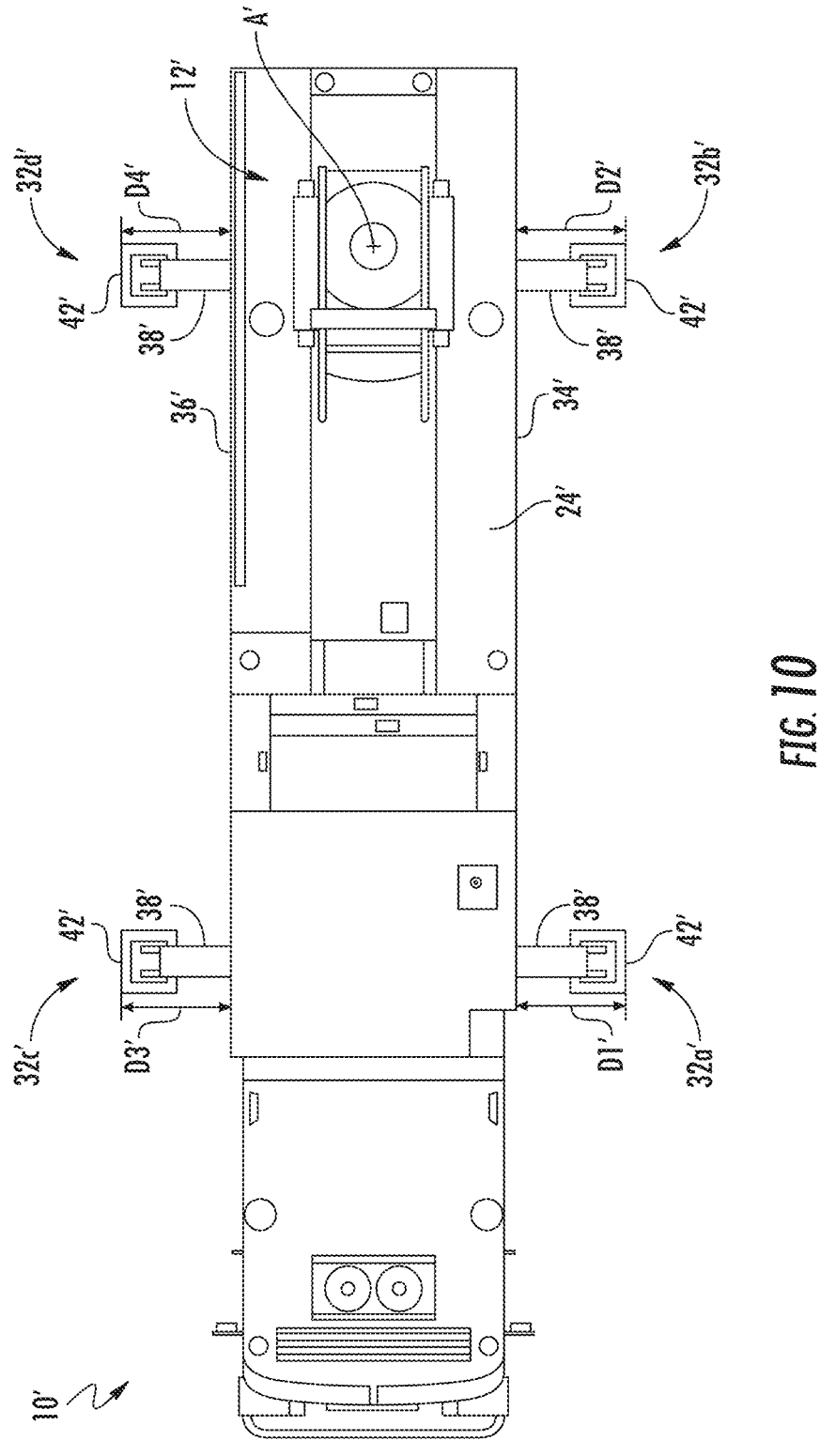
FIG. 10 is a top down view of the vehicle illustrate in FIG. 7 illustrating the stabilizers in a fully extended position.
Figure 11:
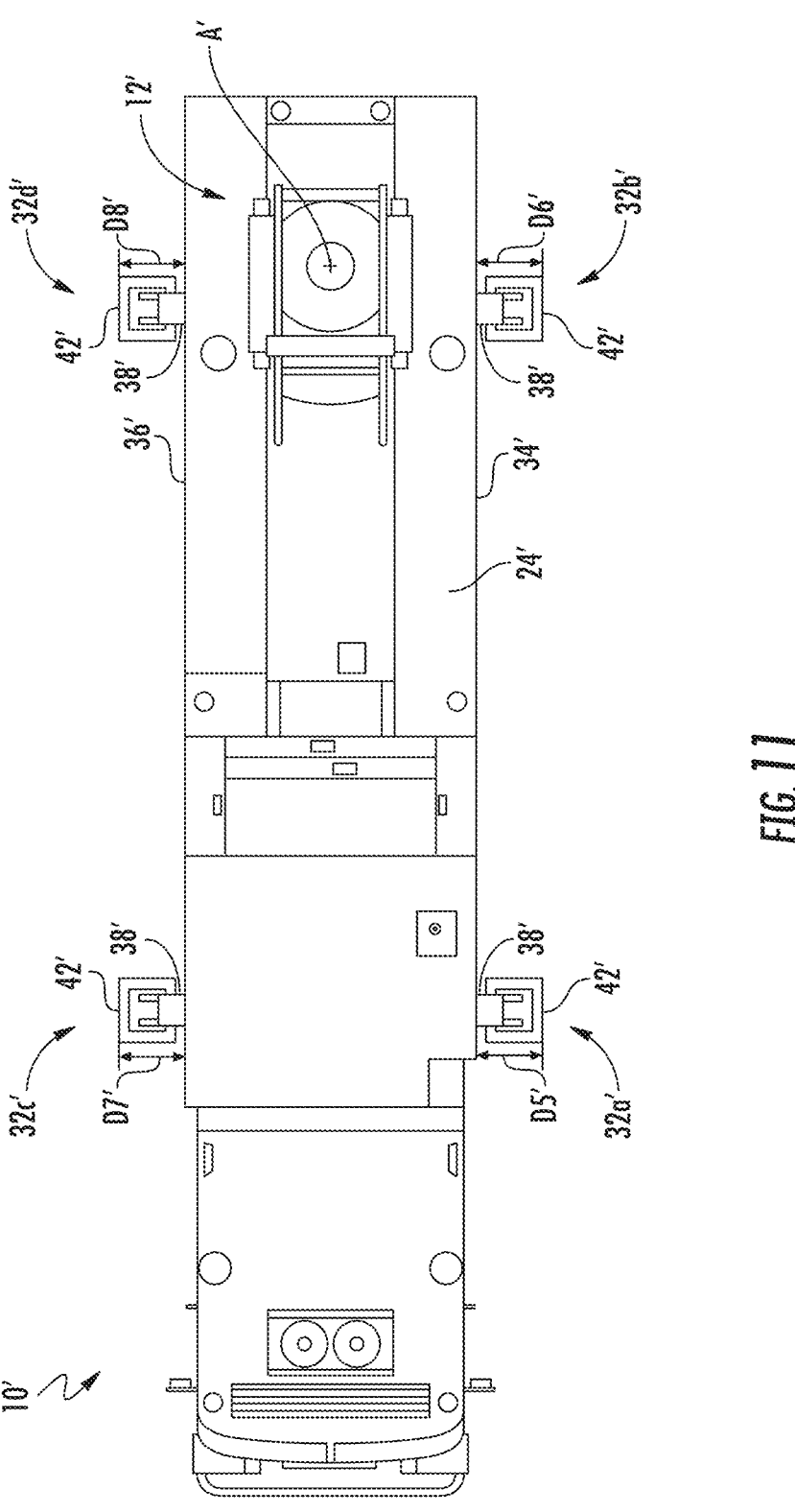
FIG. 11 is a top down view of the vehicle illustrate in FIG. 7 illustrating the stabilizers in a partially extended position.

As shown in FIGS. 10 and 11, to prevent the destabilization of the vehicle 10' and the aerial device 12', the vehicle 10' includes stabilizers 32a', 32b', 32c', and 32d' that provide support to the vehicle 10' and the aerial device 12' by widening the base of support of the vehicle 10'. As will be understood, the base of support of the vehicle 10' is increased by increasing the area of the outermost contact points of the vehicle 10' by extending the stabilizers 32a', 32b', 32c', and 32d' away from the body 24' of the vehicle 10' and having the stabilizers 32a', 32b', 32c', and 32d' make contact with the ground 48' that surrounds the body 24' of the vehicle 10'.

As illustrated, the stabilizers 32a', 32b' extend from the first side 34' of the body 24' of the vehicle 10' and stabilizers 32c', 32d' that extend from the second side 36' of the body of the vehicle 10'. The stabilizers 32a', 32b', 32c', 32d' include a bar 38' and a stabilizing pad 42' that makes contact with the ground 48' surrounding the vehicle 10' when the bars 38' of the stabilizers 32a', 32b', 32c', 32d' are in an at least partially extended state.

FIG. 10 illustrates the stabilizers 32a', 32b', 32c', 32d' in a fully extended position where the bars 38' of the stabilizers 32a', 32b' have been extended their full length relative to the first side 34' of the vehicle 10' and the bars 38' of stabilizers 32c', 32d' have been extended their full length relative to the second side 36' of the vehicle 10'.

When the beams 38' of the stabilizers 32a', 32b', 32c', 32d' have been extended the stabilizing pads 42' make contact with and rest against the ground 48'. As will be understood, when the stabilizing pads 42' of the stabilizers 32a', 32b', 32c', 32d' make contact with the ground 48' they act as a way to provide support to and stabilize the vehicle 10' from the shifting load created by the rotation of the aerial device 12' about axis A' as well as the extension and retraction of the aerial device 12' along axis B'.

FIG. 11 illustrates the stabilizers 32a', 32b', 32c', 32d' in only a partially extended position. The stabilizers 32a', 32b', 32c', 32d' are only extended a distance D5', D6', D7', D8' that represents a portion the fully extended positions D1', D2', D3', D4' of respective stabilizers 32a', 32b', 32c', 32d' (see FIG. 10).

As will be understood, when the stabilizers 32a', 32b', 32c', 32d' are in their fully extended position, as shown in FIG. 10, they provide the maximum amount of support to the vehicle 10' when the aerial device 12' is deployed because the full extension of the stabilizers 32a', 32b', 32c', 32d' creates the largest base of support for the vehicle 10', which in turn helps to prevent the vehicle 10' from tilting as the weight of the aerial device 12' is shifted during its use.

As will also be understood, when the stabilizers 32a', 32b', 32c', 32d' are in their partially extended position, as shown in FIG. 11, they provide only a portion of the maximum amount of support to the vehicle 10' when the aerial device 12' is deployed relative to when stabilizers 32a', 32b', 32c', 32d' are in their fully extended position (see FIG. 10) because the stabilizers 32a', 32b', 32c', 32d' are forming only a portion of the largest support base possible for the vehicle 10', which, as discussed above, is when the stabilizers 32a', 32b', 32c', 32d' are in their fully extended positon (see FIG. 10).

Thus, as will be understood, when the stabilizers 32a', 32b', 32c', 32d' are in their partially extended position they do provide support to the vehicle 10' to help it from tilting as the weight of the aerial device 12' is shifted during its use, but not as much support as when the stabilizers 32a', 32b', 32c', 32d' are in their fully extended position (see FIG. 10).

Figure 12:
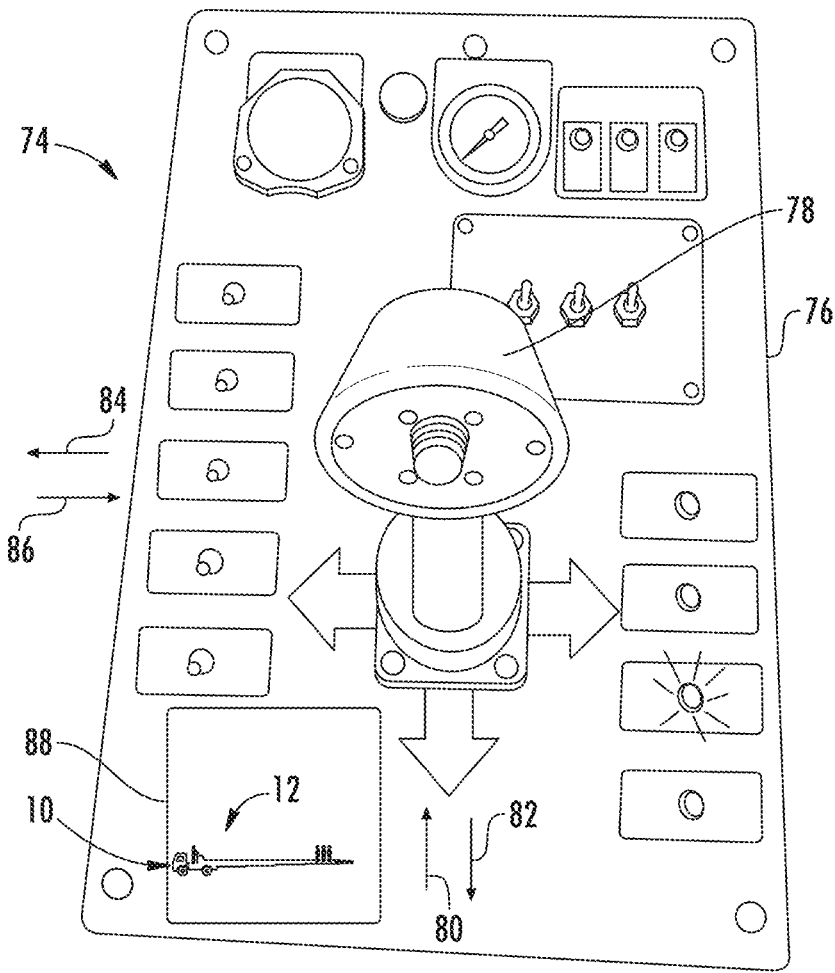
FIG. 12 illustrates a control panel for an aerial device incorporating an electronic display according to one embodiment of the present invention.

FIG. 12 illustrates one embodiment of a control panel 74 for an aerial device 12 according to an embodiment of the present invention. The control panel 74 has a controller 76 including a joystick 78 with an integrated electronic display 88.

To extend the ladder 14 and platform device 22 in the first direction 28 along axis B (see FIGS. 1A and 1B) using the control panel 74 the operator will push the joystick 78 in the forward direction 80. Likewise, to retract the ladder 14 and platform device 22 in the second direction 30 along axis B the operator will push the joystick 78 in the reverse direction 82.

Further, to rotate the ladder 14 and platform 22 about axis A (see FIGS. 1A and 1B) using the control panel 74 the operator will push the joystick 78 in the first side direction 84 to rotate the control means 16 in in the first direction 23 about axis A and will push the joystick 78 in the second side direction 86 to rotate the control means 16 in the second direction 25 about axis A.

Figure 19:
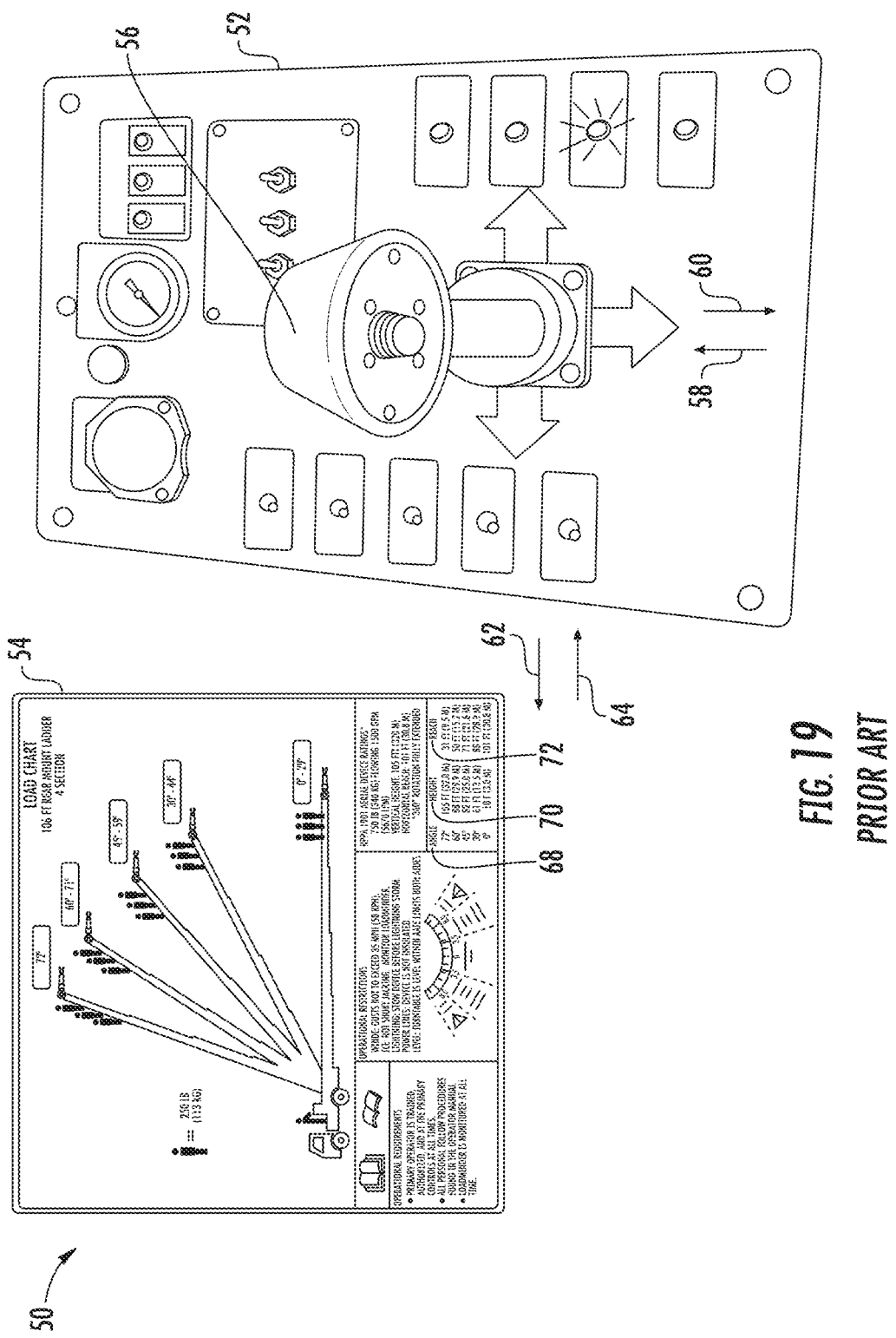
FIG. 19 is a perspective view of a traditional physical load chart and a joystick style control panel used for controlling an aerial device coupled to a vehicle.

However, instead of having to consult a traditional physical load chart 54 (see FIG. 19) to ascertain the operational parameters of the aerial device 12 the operator will simply need to consult the electronic display 88 that will provide the operator with an appropriate graphical representation 102, 104, 106, 108 (see FIGS. 10-13) demonstrating the capability of the aerial device 12 based on the current operational parameters.

Figure 20:
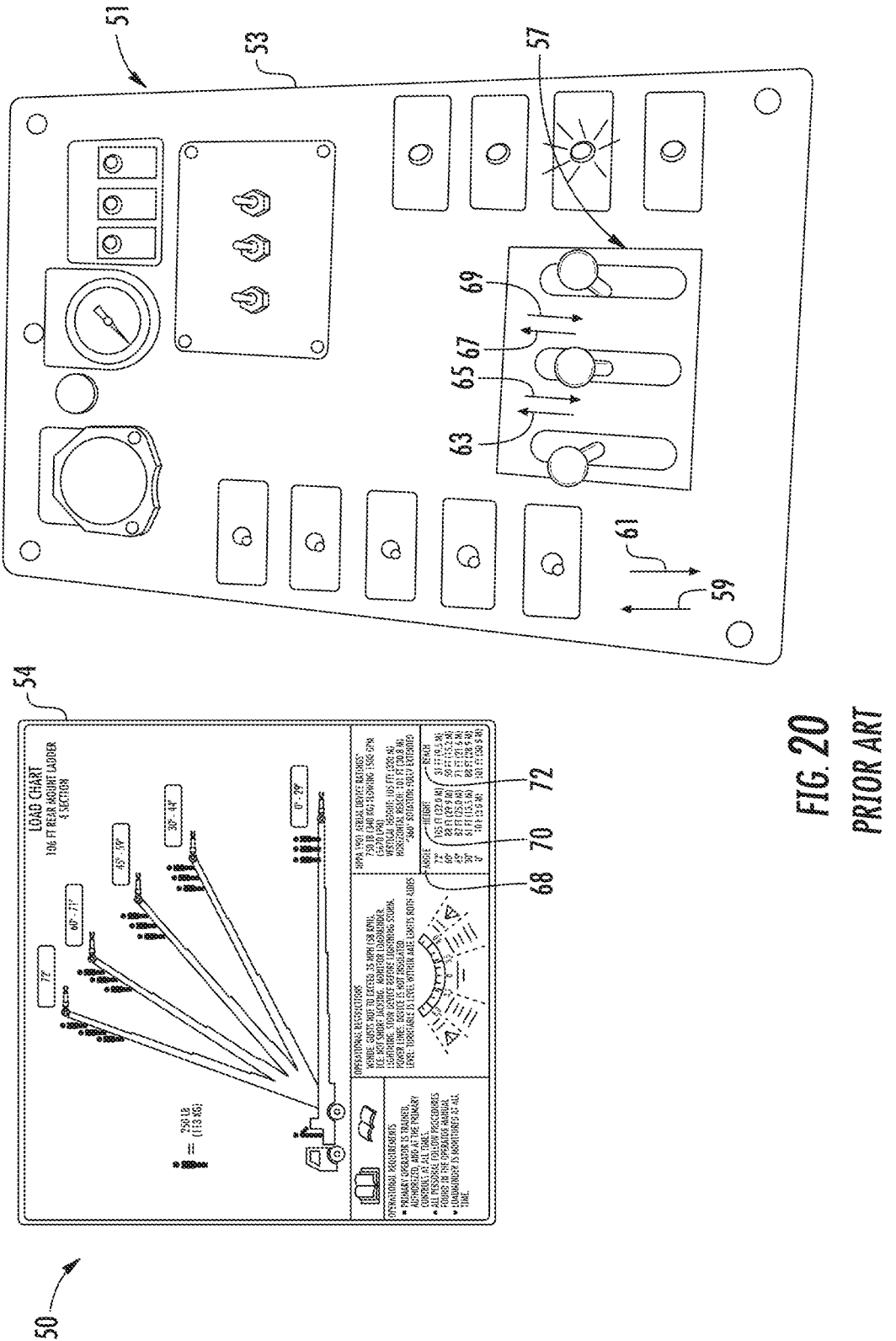
FIG. 20 is a perspective view of a traditional physical load chart and a traditional lever style control panel used for controlling an aerial device coupled to a vehicle.

As will be understood, an electronic display 88 can also be easily incorporated into the more traditional three lever controller 53 used for controlling an aerial device illustrated in FIG. 20, in order to provide the operator with an appropriate graphical representation 102, 104, 106, 108 (see FIGS. 10-13) demonstrating the capability of the aerial device 12 based on the current operational parameters.

Figure 13:
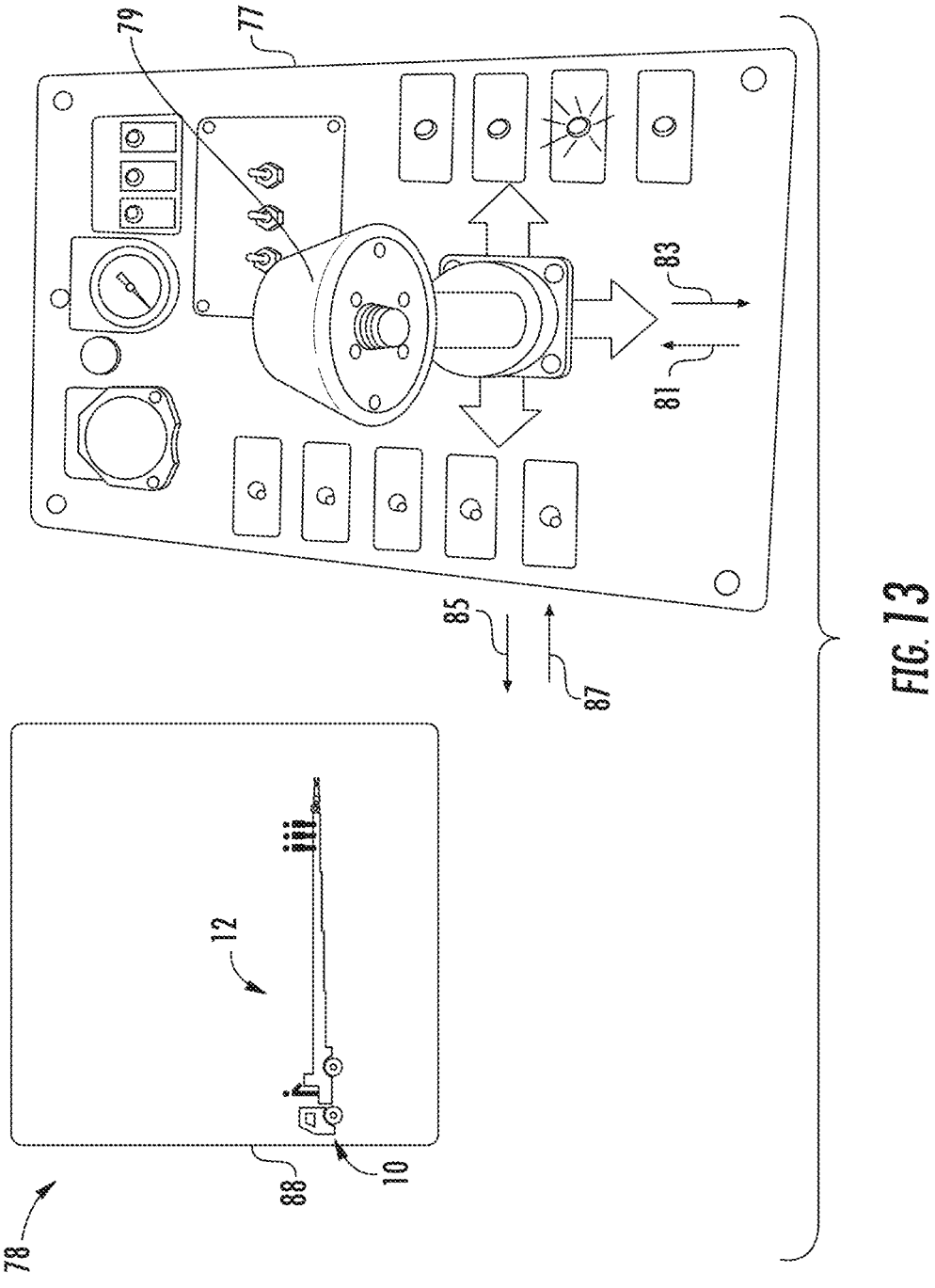
FIG. 13 illustrates a traditional control panel for an aerial device being used with a separate electronic display according to one embodiment of the present invention.

FIG. 13 illustrates another embodiment of a control panel 75 for an aerial device 12 according to the present invention. Like the embodiment of FIG. 12 the control panel 75 has a controller 77 including a joystick 79.

To extend the ladder 14 and platform 22 in the first direction 28 along axis B (see FIGS. 1A and 1B) using the control panel 75 the operator 55 will push the joystick 79 in the forward direction 81. Likewise, to retract the ladder 14 and platform 22 in the second direction 30 along axis B the operator will push the joystick 79 in the reverse direction 83.

Further, to rotate the ladder 14 and platform 22 about axis A (see FIGS. 1A and 1B) using the control panel 75 the operator 55 will push the joystick 79 in the first side direction 85 and the second side direction 87.

However, in the control panel 75 of FIG. 13 the electronic display 88 is a separate component from the controller 77.

Figure 14:
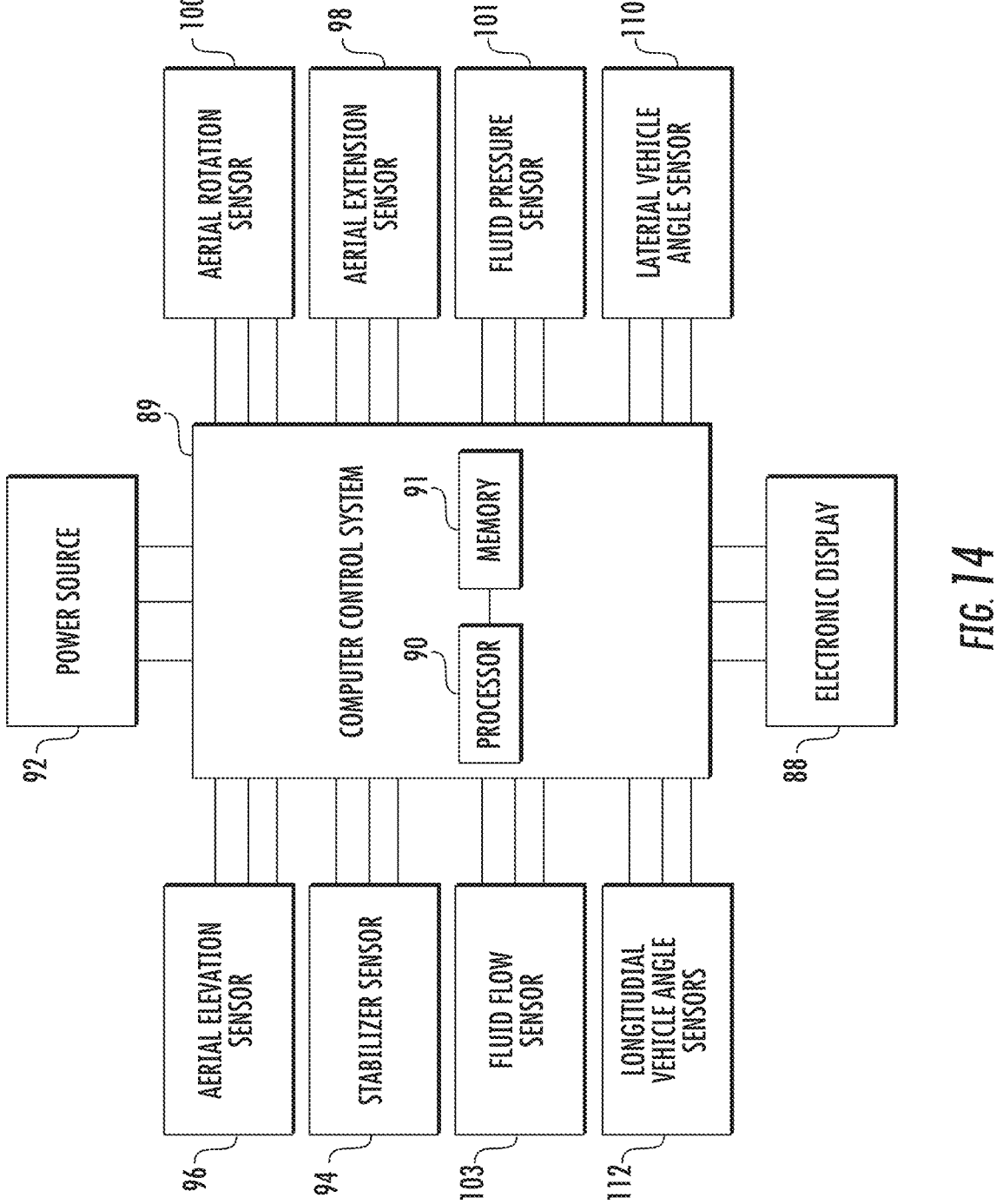
FIG. 14 schematically illustrates a computer control system for an aerial device according to one embodiment of the present invention.

As will be understood, by the electronic display 88 being a separate component from the controller 77 a user can simply install the electronic display 88 and the computer control system 89, shown in FIG. 14, to a control panel 75 without also having to upgrade the traditional controller 77. In this embodiment, the electronic display 88 and computer control system 89 can then immediately be used with the traditional controller 77 by replacing the traditional load chart 50 (see FIG. 19).

As will be understood, as the electronic display 88 is a separate component from the controller 77 it can also be designed to use with a multitude of different controllers for various aerial devices, such as, but not limited to the more traditional three lever controller 53 used for controlling an aerial device illustrated in FIG. 20, in order to provide the operator with an appropriate graphical representation 102, 104, 106, 108 (see FIGS. 10-13) demonstrating the capability of the aerial device 12 based on the current operational parameters.

FIG. 14 illustrates a computer control system 89 having a processor 90 and a memory 91. The processor 90 of the computer control system 89 is capable of executing any instructions stored in the memory of the computer control system 89.

The computer control system 89 is electrically coupled to the electronic display 88 such that the computer control system 89 can provide instructions on what message the electronic display 88 should be showing the operator based on the current operational parameters of the aerial device 12.

As will be understood, the computer control system 89 may use a number of current operational parameters to determine which message should be currently shown to the operator on the electronic display 88, such as, but not limited to, the number of people on the platform, the placement of the people on the platform, the angle that the ladder and platform are being extended, the height of the extended ladder and platform, and the reach of the extended ladder and platform, and the rotation of the ladder and platform about axis B.

The computer control system 89 is also coupled to a power source 92 that provides electrical power to the computer control system 89 and/or to the electronic display 88.

In the illustrated embodiment, the computer control system 89 is also electrically coupled to send and receive electrical signals and/or electrical power to a stabilizer sensor 94, an aerial elevation sensor 96, an aerial extension sensor 98, an aerial rotation sensor 100, a fluid presence sensor 101, a fluid flow sensor 103, a lateral vehicle angle sensor 110 and a longitudinal vehicle angle sensor 112.

The stabilizer sensor 94 senses the position of the stabilizers 32a, 32b, 32c, 32d as they are currently being deployed during the operation of the aerial device 12. The stabilizer sensor 94 will collect data on the position of each of the stabilizers 32a, 32b, 32c, 32d and send this data to the computer control system 89 where it will be used as one of the parameters to calculate the current operational parameters of the aerial device 12.

The aerial elevation sensor 96 senses the elevation of the aerial device 12 relative to the ground 48 and then transmits the elevation of the aerial device 12 to the computer control system 89 where it will be used as one of the parameters to calculate the current operational parameters of the aerial device 12.

The aerial extension sensor 98 senses how far the ladder 14 of the aerial device 12 is extended and then transmits the extension data of the aerial device 12 to the computer control system 89 where it will also be used as one of the parameters to calculate the current operational parameters of the aerial device 12.

The aerial rotation sensor 100 senses the current rotational position of the aerial device 12 about axis A (see FIGS. 1A and 1B) and then transmits the current rotational of the aerial device 12 about axis A to the computer control system 89 where it will also be used as one of the parameters to calculate the current operational parameters of the aerial device 12.

The fluid presence sensor 101 senses if fluid is present in the piping 13 (see FIG. 2) of the aerial device 12 and then transmits the fluid presence data, such as the presence or amount or pressurization of the fluid currently in the piping 13 of the aerial device 12, to the computer control system 89 where it will also be used as one of the parameters to calculate the current operational parameters of the aerial device 12.

The fluid flow sensor 103 senses if fluid is presently passing through the fluid monitor nozzle 15 at the end of the piping 13 (see FIG. 2) of the aerial device 12 and then transmits the fluid flow data to the computer control system 89 where it will also be used as one of the parameters to calculate the current operational parameters of the aerial device 12.

The lateral vehicle angle sensor 110 senses at what angle relative to earth the vehicle 10 is situated in a side-to-side orientation and then transmits the angle data to the computer control system 89 where it will also be used as one of the parameters to calculate the current operational parameters of the aerial device 12.

The longitudinal vehicle angle sensor 112 senses at what angle relative to earth the vehicle 10 is situated in a front-to-back direction and then transmits the angle data to the computer control system 89 where it will also be used as one of the parameters to calculate the current operational parameters of the aerial device 12.

As will be understood, the computer control system 89 continuously monitors and processes the data being transmitted to the computer control system 89 from the stabilizer sensor 94, the aerial elevation sensor 96, the aerial extension sensor 98, the aerial rotation sensor 100, the fluid presence sensor 101, the fluid flow sensor 103, the lateral vehicle angle sensor 110, and the longitudinal vehicle angle sensor 112. If any of the data being transmitted by the sensors 94, 96, 98, 100, 101, 103, 110, 112 changes to such a degree that the operational parameters of the aerial device 12 change then the computer control system 89 detects the changes in the operational parameters in real time and transmits the appropriate signal to change the graphical representation 102, 104, 106, 108 (see FIGS. 10-13) of the electronic display 88 in order to provide the operator with the updated operational parameters of the aerial device 12 based on the current data transmitted by the sensors 94, 96, 98, 100, 101, 103, 110, 112.

As such, the graphical representations 102, 104, 106, 108 shown to the user on the electronic display 89 are updated in real time according to the data transmitted by the sensors 94, 96, 98, 100, 101, 103, 110, 112 in order to provide the user with the most up to date operational parameters available.

Figure 15:
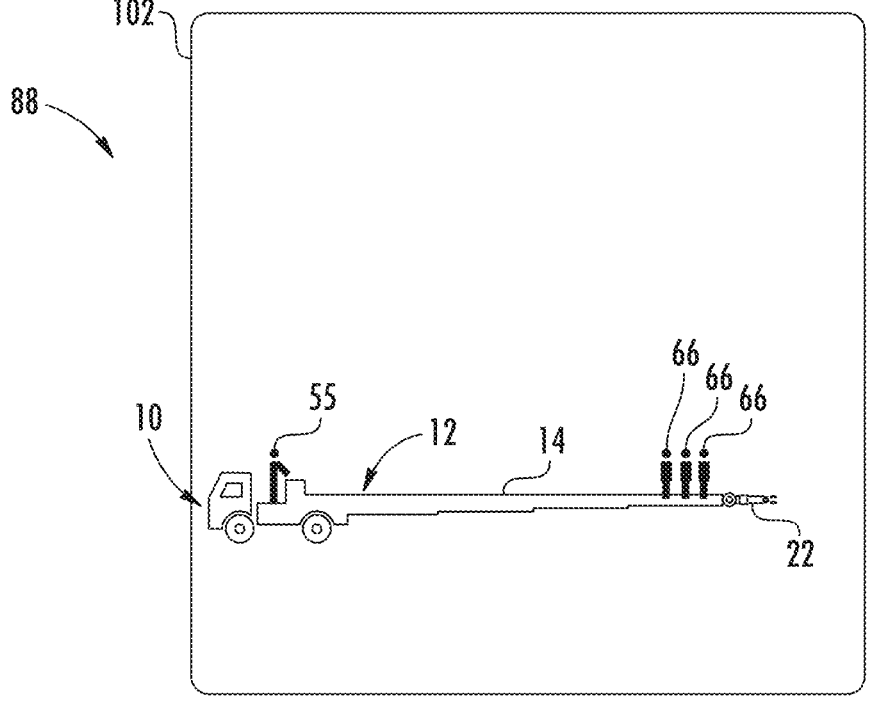
FIG. 15 illustrates a first screen shot of an electronic display according to one aspect of the present invention.

FIG. 15 illustrates a first graphical representation 102 being displayed on the electronic display 88. The first graphical representation 102 is a schematic illustration of the aerial device 12, including the ladder 14 and platform 22, the vehicle 10, user 55, and the number and position of personnel 66 that can safely use the aerial device 12 according to the current operational parameters detected by the sensors 94, 96, 98, 100, 101, 103, 110, 112.

As discussed above, the operational parameters displayed by the first graphical representation 102 are calculated by the computer control system 89 after receiving input from the stabilizer sensors 94, the aerial extension sensor 98, the aerial elevation sensor 96, the aerial rotation sensor 100, the fluid presence sensor 101, the fluid flow sensor 103, the lateral vehicle angle sensor 110, and the longitudinal vehicle angle sensor 112.

For the first graphical representation 102, the stabilizer sensor 94 senses that the stabilizers 32*a*, 32*b*, 32*c*, 32*d* current spread is 16 feet, the aerial elevation sensor 96 senses that the elevation is 0°, the aerial extension sensor 98 senses that the extension of the ladder 14 is 101 feet along axis B (see FIGS. 1A and 1B), the aerial rotation sensor 100 senses the position of the aerial device 12 about axis A (see FIGS. 1A and 1B), the fluid presence sensor 101 is not detecting fluid in the piping 13 of the aerial device 12, and the fluid flow sensor 103 does not sense that any fluid is flowing through the fluid monitor nozzle 15 at the end of the piping 13 of the aerial device 12 (see FIG. 2).

After seeing the first graphical representation 102 illustrated in FIG. 15, the user 55 is alerted of the current operating parameters of the aerial device 12 and that the aerial device 12 can safely hold three personnel 66 at the tip of the ladder 14 near the platform 22 of the aerial device 12 under the current operating parameters.

Figure 16:
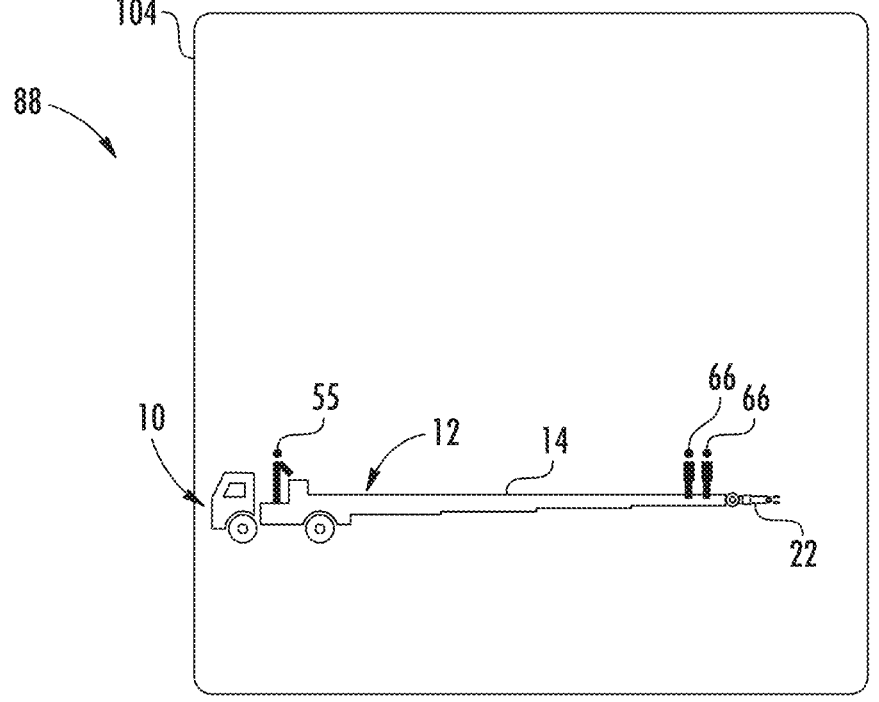
FIG. 16 illustrates a second screen shot of the electronic display illustrated in FIG. 15.

Turning to FIG. 16, illustrating a second graphical representation 104 being displayed on the electronic display 88 that visually illustrates a second set of operational parameters to be followed by the user 55.

The operational parameters being displayed by the second graphical representation 104 were calculated by the computer control system 89 after receiving a second input from the stabilizer sensors 94, the aerial extension sensor 98, the aerial elevation sensor 96, the aerial rotation sensor 100, the fluid presence sensor 101, the fluid flow sensor 103, the lateral vehicle angle sensor 110, and the longitudinal vehicle angle sensor 112.

For the second graphical representation 104, the stabilizer sensor 94 has sent a second signal to the computer control system 89 that the stabilizers 32*a*, 32*b*, 32*c*, 32*d* spread has decreased to 14 feet, the aerial elevation sensor 96 has sent a second signal to the computer control system 89 that the elevation is still 0°, the aerial extension sensor 98 has sent a second signal to the computer control system 89 that the extension of the ladder 14 is still 101 feet along axis B (see FIGS. 1A and 1B), and the aerial rotation sensor 100 senses the position of the aerial device 12 has remained the same about axis A (see FIGS. 1A and 1B), the fluid presence sensor 101 is not detecting fluid in the piping 13 of the aerial device 12, and the fluid flow sensor 103 does not sense that any fluid is flowing through the fluid monitor nozzle 15 at the end of the piping 13 of the aerial device 12 (see FIG. 2).

After seeing the second graphical representation 104, illustrated in FIG. 16, the user 55 is alerted of the current operating parameters of the aerial device 12 and that the aerial device 12 can safely hold two personnel 66 at the tip of the ladder 14 near the platform 22 of the aerial device 12 under the current operating parameters.

Figure 17:
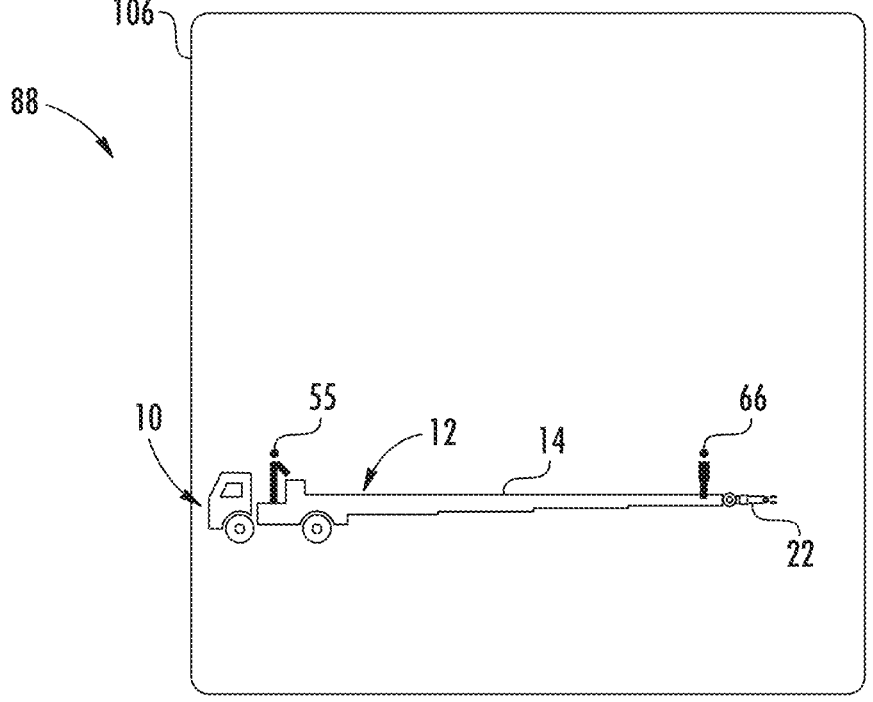
FIG. 17 illustrates a third screen shot of the electronic display illustrated in FIG. 15.

FIG. 17, illustrates a third graphical representation 106 displayed on the electronic display 88 that visually illustrates a third set of operational parameters to be followed by the user 55.

The operational parameters being displayed by the third graphical representation 106 were calculated by the computer control system 89 after receiving a third input from the stabilizer sensors 94, the aerial extension sensor 98, the aerial rotation sensor 100, the fluid presence sensor 101, the fluid flow sensor 103, the lateral vehicle angle sensor 110, and the longitudinal vehicle angle sensor 112.

For the third graphical representation 106, the stabilizer sensor 94 has sent a third signal to the computer control system 89 that the stabilizer 32*a*, 32*b*, 32*c*, 32*d* spread has decreased to 12 feet, the aerial elevation sensor 96 has sent a third signal to the computer control system 89 that the elevation is still 0°, the aerial extension sensor 98 has sent a third signal to the computer control system 89 that the extension of the ladder 14 is still 101 feet along axis B (see FIGS. 1A and 1B), and the aerial rotation sensor 100 senses the position of the aerial device 12 has remained the same about axis A (see FIGS. 1A and 1B), the fluid presence sensor 101 is not detecting fluid in the piping 13 of the aerial device 12, and the fluid flow sensor 103 does not sense that any fluid is flowing through the fluid monitor nozzle 15 at the end of the piping 13 of the aerial device 12 (see FIG. 2).

After seeing the third graphical representation 106, illustrated in FIG. 17, the user 55 is alerted of the current operating parameters of the aerial device 12 and that the aerial device 12 can only safely hold one person 66 at the tip of the ladder 14 near the platform 22 of the aerial device 12 under the current operating parameters.

Figure 18:
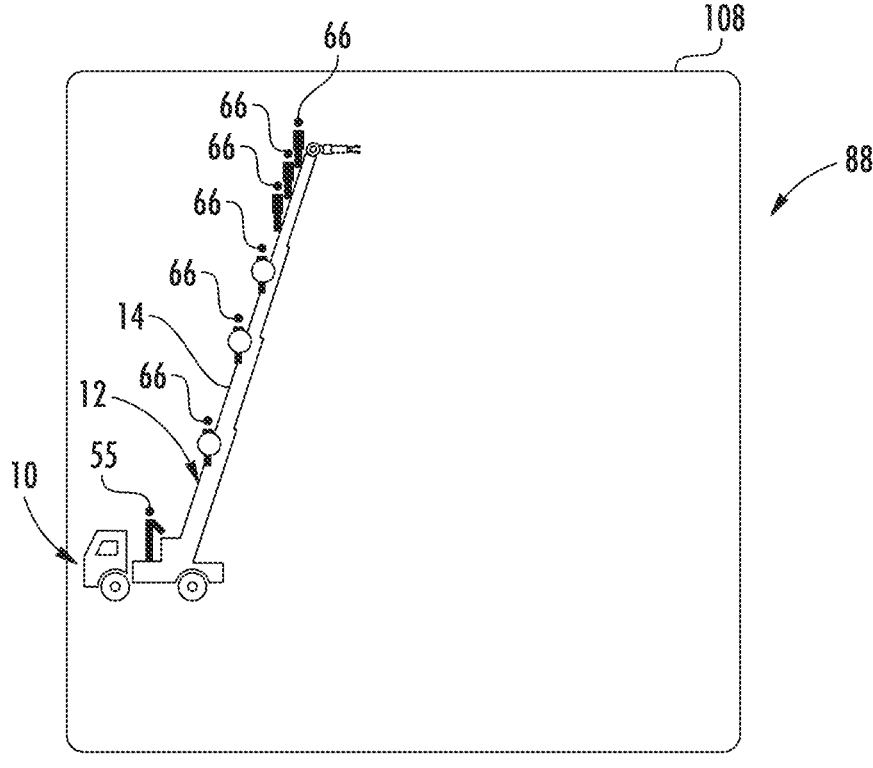
FIG. 18 illustrates a fourth screen shot of the electronic display illustrated in FIG. 15.

FIG. 18 illustrates a fourth graphical representation 108 displayed on the electronic display 88 that visually illustrates a fourth set of operational parameters to be followed by the user 55.

The operational parameters being displayed in the fourth graphical representation 108 were calculated by the computer control system 89 after receiving a fourth input from the stabilizer sensors 94, the aerial extension sensor 98, the aerial elevation sensor 96, the aerial rotation sensor 100, the fluid presence sensor 101, the fluid flow sensor 103, the lateral vehicle angle sensor 110, and the longitudinal vehicle angle sensor 112.

For the fourth graphical representation 108, the stabilizer sensor 94 has sent a fourth signal to the computer control system 89 that the stabilizer 32*a*, 32*b*, 32*c*, 32*d* spread is 16 feet, the aerial elevation sensor 96 has sent a fourth signal to the computer control system 89 that the current elevation is 72°, the aerial extension sensor 98 has sent a fourth signal to the computer control system 89 that the extension of the ladder 14 is still 101 feet along axis B (see FIGS. 1A and 1B), and the aerial rotation sensor 100 senses the position of the aerial device 12 has remained the same about axis A (see FIGS. 1A and 1B), the fluid presence sensor 101 is not detecting fluid in the piping 13 of the aerial device 12, and the fluid flow sensor 103 does not sense that any fluid is flowing through the fluid monitor nozzle 15 at the end of the piping 13 of the aerial device 12 (see FIG. 2).

After seeing the fourth graphical representation 108 illustrated in FIG. 18, the user 55 is alerted of the current operating parameters of the aerial device 12 and that the aerial device 12 can safely hold three personnel 66 at the tip of the ladder 14 while three other personnel are using the ladder 14 under the current operating parameters.

As will be understood, any number of graphical representations based on the current operating parameters of the aerial device 12 can be programmed into the computer control system 89 and can be immediately displayed to the user 55 such that the user 55 is given constant updates regarding the operating parameters of the aerial device 12 in order to keep the personal 66 using the aerial device 12 safe.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A vehicle comprising:
a body;
an aerial device operable to elevate, rotate, extend, and retract relative to the body, the aerial device movable relative to the body from a first position to a second position;
a control panel that includes a controller, the controller movable by an operator to move the aerial device from the first position to the second position;
an electronic display;
a computer control system including a sensor that detects an operational parameter of the aerial device when the aerial device is in the first position and when the aerial device is in the second position, the sensor operable to output a first signal for the operational parameter when the aerial device is in the first position and the sensor operable to output a second signal for the operational parameter when the aerial device is in the second position; and
wherein, when the aerial device is in the first position, the computer control system generates a first graphical representation of the current operating ability of the aerial device in response to the first signal and displays the first graphical representation on the electronic display;
wherein, when the aerial device is in the second position, the computer control system generates a second graphical representation of the current operating ability of the aerial device in response to the second signal and displays the second graphical representation on the electronic display;
wherein the first graphical representation of the current operating ability of the aerial device and the second graphical representation of the current operating ability of the aerial device both include a graphical representation of a number of personnel that can use the aerial device; and
wherein the first graphical representation of the current operating ability of the aerial device and the second graphical representation of the current operating ability of the aerial device both include a graphical representation of a location along the aerial device of the number of personnel.

2. The vehicle of claim 1, wherein the first graphical representation of the current operating ability of the aerial device includes the operational parameter of the aerial device when the aerial device is in the first position and the second graphical representation of the current operating ability of the aerial device includes the operational parameter of the aerial device when the aerial device is in the second position.

3. The vehicle of claim 1, wherein the first graphical representation of the current operating ability of the aerial device includes a graphical representation of a first number of personnel that can use the aerial device and the second graphical representation of the current operating ability of the aerial device includes a graphical representation of a second number of personnel that can use the aerial device.

4. The vehicle of claim 1, further comprising a stabilizer operable to extend away from the body and configured to contact a ground surface, wherein the computer control system includes a stabilizer sensor that senses an operational parameter of the stabilizer, and wherein the computer control system receives a piece of data sensed by the stabilizer sensor and generates the first and second graphical representations of the current operating ability of the aerial device based on the operational parameter of the stabilizer.

5. The vehicle of claim 4, wherein the operational parameter of the stabilizer detected by the stabilizer sensor is the spread of the stabilizer.

6. The vehicle of claim 5, wherein the first and second graphical representations of the current operating ability of the aerial device include the operational parameter of the stabilizer.

7. The vehicle of claim 1, wherein the sensor includes an aerial elevation sensor that senses an elevation of the aerial device, wherein the operational parameter of the aerial device when the aerial device is in the first and the second positions includes the elevation of the aerial device.

8. The vehicle of claim 1, wherein the sensor includes an aerial rotation sensor that senses a rotational position about a rotational axis of the aerial device, wherein the operational parameter of the aerial device when the aerial device is in the first and the second positions includes the rotational position about the rotational axis of the aerial device.

9. The vehicle of claim 1, wherein the sensor includes an aerial extension sensor that senses an extension of the aerial device along an extension axis, wherein the operational parameter of the aerial device when the aerial device is in the first and the second positions includes the extension of the aerial device along the extension axis.

10. The vehicle of claim 1, wherein the sensor includes a fluid presence sensor that senses fluid presence in a piping of the aerial device, wherein the operational parameter of the aerial device when the aerial device is in the first and the second positions includes the fluid presence in the piping of the aerial device.

11. The vehicle of claim 1, wherein the sensor includes a fluid flow sensor that senses fluid flow out of a fluid monitor nozzle, wherein the operational parameter of the aerial device when the aerial device is in the first and the second positions includes the fluid flow out of the fluid monitor nozzle.

12. The vehicle of claim 1, wherein the controller includes a joystick.

13. The vehicle of claim 12, wherein the joystick is movable by the operator in a first direction to extend the aerial device, the joystick is movable by the operator in a second direction to retract the aerial device, the joystick is movable by the operator in a third direction to rotate the aerial device in a first rotational direction, and the joystick is movable by the operator in a fourth direction to rotate the aerial device in a second rotational direction.

14. The vehicle of claim 1, wherein the controller includes a first lever, a second lever, and a third lever, wherein the first lever is movable by the operator to extend the aerial device, wherein the second lever is movably by the operator to rotate the aerial device, and wherein the third lever is operable to raise and lower the aerial device.

15. The vehicle of claim 1, wherein the control panel includes the electronic display.

16. The vehicle of claim 1, wherein the body includes a fire truck body.

17. The vehicle of claim 1, wherein the sensor is a first sensor, wherein the first sensor includes an aerial elevation sensor that senses an elevation of the aerial device, wherein the operational parameter of the aerial device when the aerial device is in the first and the second positions includes the elevation of the aerial device, the vehicle further comprising a second sensor, wherein the second sensor includes an aerial rotation sensor that senses a rotational position about a rotational axis of the aerial device, wherein the operational parameter of the aerial device when the aerial device is in the first and the second positions includes the rotational position about the rotational axis of the aerial device, the vehicle further comprising a third sensor, wherein the third sensor includes an aerial extension sensor that senses an extension of the aerial device along an extension axis, wherein the operational parameter of the aerial device when the aerial device is in the first and the second positions includes the extension of the aerial device along the extension axis.

18. The vehicle of claim 17, wherein the first graphical representation of the current operating ability of the aerial device and the second graphical representation of the current operating ability of the aerial device both include a graphical representation of a number of personnel that can use the aerial device.

19. A vehicle comprising:
a body;
an aerial device operable to elevate, rotate, extend, and retract relative to the body, the aerial device movable relative to the body from a first position to a second position;
a control panel that includes a controller, the controller movable by an operator to move the aerial device from the first position to the second position;
an electronic display;
a computer control system including a sensor that detects an operational parameter of the aerial device when the aerial device is in the first position and when the aerial device is in the second position, the sensor operable to output a first signal for the operational parameter when the aerial device is in the first position and the sensor operable to output a second signal for the operational parameter when the aerial device is in the second position; and
wherein, when the aerial device is in the first position, the computer control system generates a first graphical representation of the current operating ability of the aerial device in response to the first signal and displays the first graphical representation on the electronic display; and
wherein, when the aerial device is in the second position, the computer control system generates a second graphical representation of the current operating ability of the aerial device in response to the second signal and displays the second graphical representation on the electronic display; and
wherein the sensor is a lateral vehicle angle and wherein the first signal and second signal are based on an angle relative to earth that the vehicle is situated in a side-to-side orientation;
wherein the first graphical representation and the second graphical representation both include a graphical representation of a number of personnel that can use the aerial device and a location of the number of personnel along the aerial device.

* * * * *